United States Patent
Liao

(10) Patent No.: US 7,990,314 B2
(45) Date of Patent: Aug. 2, 2011

(54) METHOD AND SYSTEM FOR LOCATING A GEOGRAPHICAL POSITION USING BROADCAST FREQUENCY MODULATION SIGNALS

(76) Inventor: Henry H. Liao, Los Alamitos, CA (US)

( * ) Notice: Subject to any disclaimer, the term of this patent is extended or adjusted under 35 U.S.C. 154(b) by 437 days.

(21) Appl. No.: 12/215,832

(22) Filed: Jun. 30, 2008

(65) Prior Publication Data

US 2009/0322603 A1 Dec. 31, 2009

(51) Int. Cl.
*G01S 19/46* (2010.01)
*G01S 5/02* (2010.01)
*G01S 5/12* (2006.01)

(52) U.S. Cl. ............... 342/357.29; 342/357.71; 342/417; 342/463; 455/456.5

(58) Field of Classification Search ............ 342/357.29, 342/357.64, 357.71, 417, 463; 455/456.2; G01S 5/02, 5/12, 19/46
See application file for complete search history.

(56) References Cited

U.S. PATENT DOCUMENTS

| | | | | |
|---|---|---|---|---|
| 5,173,710 A * | 12/1992 | Kelley et al. | ................. | 342/463 |
| 5,758,288 A * | 5/1998 | Dunn et al. | ................. | 455/456.5 |
| 6,035,202 A * | 3/2000 | Camp, Jr. | ................. | 455/456.1 |
| 6,219,385 B1 * | 4/2001 | Weinberg | ................. | 375/259 |
| 7,042,396 B2 | 5/2006 | Omura et al. | | |
| 7,202,816 B2 | 4/2007 | Krumm et al. | | |
| 2005/0020210 A1 | 1/2005 | Krumm et al. | | |
| 2005/0020277 A1 | 1/2005 | Krumm et al. | | |
| 2005/0020278 A1 | 1/2005 | Krumm et al. | | |
| 2007/0281622 A1 * | 12/2007 | Nishimura et al. | ......... | 455/67.11 |
| 2008/0311870 A1 * | 12/2008 | Walley et al. | .............. | 455/186.1 |

FOREIGN PATENT DOCUMENTS

| EP | 04016227.3 | 9/2004 |
|---|---|---|
| EP | 04016269.5 | 9/2004 |

OTHER PUBLICATIONS

Zagami, J.M., Parl, S.A., Bussgang, J.J., Melillo, K.D., "Providing Universal Location services Using a Wireless E911 Location Network", IEEE Communication Magazine, Apr. 1998.
Drane, C., Macnaughtan, M., Scott, C., "Positioning GSM Telephones" IEEE Communication Magazine, Apr. 1998, pp. 46-59.
Birchler, Mark, "E911 Phase 2 Location Solution Landscape", Wireless Access Technology Research, Motorola Labs, Jun. 28, 1999.
"Overview of Location Technologies", Openwave, Nov. 19, 2002.
Z. Xiang et al., "A wireless LAN-based indoor positioning technology", IBM Journal of Research & Development, Sep./Nov. 2004, vol. 48, No. 5/6.
Li, B., Dempster, A., Rizos, C., "Hybrid Method for Localization Using WLAN", Joel Barnes School of Surveying and Spatial Information System, University of New South Wales, Sydney. http://www.gmat.unsw.edu.au/snap/publications/lib_etal2005c.pdf.

(Continued)

*Primary Examiner* — Thomas H Tarcza
*Assistant Examiner* — John B Vigushin

(57) ABSTRACT

A method and system for locating and positioning using broadcast frequency modulation (FM) signals, is provided. One implementation involves receiving FM stereo signals from three FM stations at one or more receivers, each stereo signal including a modulated 19 KHz FM pilot tone; and determining a geographical position at each receiver based on the phase difference of the demodulated pilot tones in the received FM signals.

36 Claims, 21 Drawing Sheets

OTHER PUBLICATIONS

Hatami, A., "Application of Channel Modeling for Indoor Localization Using TOA and RSS", http://www.wpi.edu/Pubs/ETD/Available/etd-053106-160141/unrestricted/hatami_phd_dissertation_2006.pdf, May 2006.

Reynolds, M.S., "A Phase Measurement Radio Positioning System for Indoor Use", MS Thesis, at the Massachusetts Institute of Technology, Feb. 3, 1999., http://lab.cba.mit.edu/phm/theses/99.02.reynolds.pdf.

Reynolds, M.S., "Low Frequency Indoor Radiolocation", Ph.D Thesis M.I.T. Feb. 2003, http://lab.cba.mit.edu/phm/theses/03.02.reynolds.pdf.

Mcellroy, J., Raquet, J.F., Temple, M.A., "Finding Your Way with AM Signals of Opportunity", Innovation: Opportunistic Navigation, Jul. 1, 2007, GPS World, http://sidt.gpsworld.com/gpssidt/content/printContentPopup.jsp?id=439933.

Thompson, D., Vanderspek, P., Miller, C., "Microsoft's Smart Personal Objects Technology (SPOT) Initiative; Part II: Rendering Architecture, Information Services & Developer Potential," http://br.sys-con.com/read/48815.htm.

Hightower, J., Borriello, G., "Location Systems for Ubiquitous Computing," IEEE Computer Society, pp. 57-66, Aug. 2001, vol. 34, issue 8., University of Washington.

Krumm, J., Cermak, G., Horvitz, G., "RightSPOT: A Novel Sense of Location for a Smart Personal Object", UbiComp 2003, Microsoft Research, Microsoft Corporation, Oct. 2003. http://research.microsoft.com/~jckrumm/Publications%202003/rightSPOT%20publish.pdf.

Youssef, A., Drumm, J., Miller, E., Cermak, G., Horvitz, E., "Computing Location from Ambient FM Radio Signals", Microsoft Crop. 2003.

Rabinowitz, M., et al., "A New Positioning System Using Television Synchronization Signals," IEEE Transactions on Broadcasting, pp. 51-61, Mar. 2005, vol. 51, issue 1.

"Zero Crossing Detectors and Comparators", Elliott Sound Products, Application Notes, AN-005, 2004.http://sound.westhost.com/appnotes/an005.htm, pp. 1-5.

Azad K., "Indoor Positioning", COS 398 (Junior Independent Work) Final Report, May 6, 2002, http://www.cs.princeton.edu/~kazad/resources/cs/positioning/htmlreport/cs398report.html.

A. Hatamli, and K. Pahlavan, Hybrid TOA-RSS Based Localization Using Neural Networks, Proceedings of IEEE Globecom, Nov. 27-Dec. 1, 2006., pp. 1-5, San Francisco, CA.

J.A. Mcellroy, Thesis on: Navigation Using Signals of Opportunity in the AM Transmission Band, Air Force Institute of Technology, School of Engineering and Management Report, Sep. 2006., The Wight-Patterson Air Force Base, OH.

B.S. Kim, Thesis on: Evaluating the correlation Characteristics of Arbitrary AM and FM Radio Signals for the Purpose of Navigation, Air Force Institute of Technology, School of Engineering and Management Report Mar. 2006, The Wight-Patterson Air Force Base, OH.

* cited by examiner

60

METHOD AND SYSTEM FOR LOCATING A GEOGRAPHICAL POSITION USING BROADCAST FREQUENCY MODULATION SIGNALS

FIELD OF THE INVENTION

The present invention relates to positioning systems, and in particular to positioning systems that are suitable for indoor positioning.

BACKGROUND OF THE INVENTION

The Global Positioning Satellites (GPS) system provides coordinates for navigation. GPS uses 24 to 27 half geo-synchronous satellites for triangulation positioning in three dimensions. GPS has many deficiencies in global coverage. Current GPS signals cannot be used indoors since GPS receivers need line-of-sight signal reception, and the signal level is too weak to penetrate building structure. It is also difficult to acquire the low elevation angle GPS satellites in city areas due to the blockage by high rise buildings. GPS requires large and expensive national resources to continuously manufacture, launch and maintain. In addition, the cost of GPS receivers is relatively high due to the complexity of the signal structure, the need to compensate interference, and ionosphere delays with relatively weak signals.

Prior to GPS, a Long Range Positioning (LORAN) system was used for navigation. The LORAN system uses hyperbolic positioning theory rather than spherical triangulation theory of GPS. The hyperbolic positioning uses time-difference-of-arrival (TDOA), while the spherical theory uses time-of-arrival (TOA). Both hyperbolic positioning theory and spherical triangulation theory must have the base stations perfectly synchronized in time for high precision. In LORAN systems, one primary high frequency (HF) radio station and two slave stations transmit pulsed signals with known periods and different frequencies. Legacy geometric theory, the constant difference line between two points is a hyperbolic curve. A pair of hyperbolic curve intersection points determines the position of an object. The position of the object is determined by the difference of distance (TDOA) from two pairs of stations. Modern LORAN systems (enhanced), can take advantage of GPS, or use synchronized atomic clocks for all stations to avoid the master slave station relationships.

An OMEGA system has also been used for long range locating using VLF (very low frequency) signals. The frequency band is in the range of 11 to 15 KHz, which has a very long wavelength and propagates for long distances. Different from LORAN, OMEGA uses phase difference of two continuous waveform signals to determine position. However, position accuracy is not precise (4 nautical miles) due to several reasons: The phase ambiguity of many cycles for long distances; the multiple paths of the waveform from ionosphere; the stratosphere, and ocean or ground reflected signals mixed with direct line of sight signals; and, clock synchronization errors of the base stations that are far apart.

A recent historical need of object locating system is triggered by the E-911 effort. It was mandated by the Federal Communications Commission (FCC) that the cell phone industry provide rough position information to law enforcement agencies for 911 calls. Due to the infrastructure of cell phone relay towers, the locating systems are more conveniently based on existing cell tower base stations. Base stations can be synchronized in time by the cell phone company via network or GPS time. The technologies used by GSM (Global System for Mobile communications) cell phones are TOA, AOA (Angle-Of-Arrival), E-OTD (Enhanced-Observed-Time-Difference), and A-GPS. The technologies used by CDMA (Code Division Multiple Access) cell phones are A-FLT (Advanced-Forward-Link-Triangulation). The technology used by TDMA (Time Division Multiple Access) cell phone is the A-GPS. A-GPS has accuracy of around 5 meters with networked assisted timing for reduced acquisition time. The AFLT and E-OTD have accuracy of around 100 meters. The TDOA and AOA have accuracy of about 150 meters. Other than GPS, the cell phone positioning accuracy is only good for E-911 purposes, and not suitable for indoor locating applications.

Modern indoor location systems use WiFi (Wideband Fidelity), or other LAN (Local Area Network) signals for triangulation based on multi-stations Radio Signal Strength (RSS), TOA, TDOA or a hybrid of the above techniques. The problem for such indoor signal propagation is the uneven attenuation and reflection caused by walls, room partitions and metal furniture. Their accuracy is degraded even at short indoor distances at high frequency (2.4 GHz). In addition, it needs the existence of well established WiFi network architecture.

Other locating systems attempt use of commercial broadcasting AM radio signals phase correlation for navigation. Such approaches relied on commercial AM frequencies, ranging from 520 KHz to 1710 KHz (approximately 200 meters to 600 meters in wavelength), which is suitable for indoor use, but the signals can suffer significant distortions around large conductors inside structures.

Since AM signals can be attenuated easily by blockage and building, FM signals vary in phase, another approach has been to use the constant envelop signal strength of FM signals rather than the phase, for location base service (LBS). This approach (called SPOT watch) uses a miniature FM signal receiver installed inside a watch size display device for LBS services. The radio signal strength (RSS) ranking of a number of FM stations is used to determine the neighborhood of a city for LBS. By using the statistical ranking of 5 to 11 stations with simulated signal strength, a rough position within 5 miles of township can be located. However, the position accuracy of 5 miles is imprecise, though it serves the purpose of LBS.

BRIEF SUMMARY OF THE INVENTION

A method and system for locating a geographical position using broadcast frequency modulation signals, is provided. One embodiment involves receiving FM stereo signals from three FM stations at one or more receivers, each stereo signal including a modulated 19 KHz FM pilot tone; and determining a geographical position at each receiver based on the phase difference of the demodulated pilot tones in the received FM signals.

These and other features, aspects and advantages of the present invention will become understood with reference to the following description, appended claims and accompanying figures.

DETAILED DESCRIPTION OF THE INVENTION

The present invention provides a method and system for locating and positioning using broadcast frequency modulation (FM) signals. One embodiment involves using multiplexed pilot tone signals of broadcast FM signals for location and position determination. The broadcast FM signals may include commercial broadcast FM radio signals. The phase of the FM signal, specifically the multiplex pilot tone signal, is used for positioning. As a result, existing commercial broadcast FM radio signals can be used for locating, positioning and navigation in many applications, including indoor applications.

In one implementation, three or more FM stereo radio station signals, such as existing radio station broadcast FM signals, are utilized. In the following, use of three radio stations is described, however, more stations may also be used, which, result in more position fixes. Higher accuracy can be obtained using a multiple average. For example, if four stations are used, then $_4C_3=4$ position fixes may be obtained. If five stations are used, then $_5C_3=10$ position fixes may be obtained.

Figure 1:
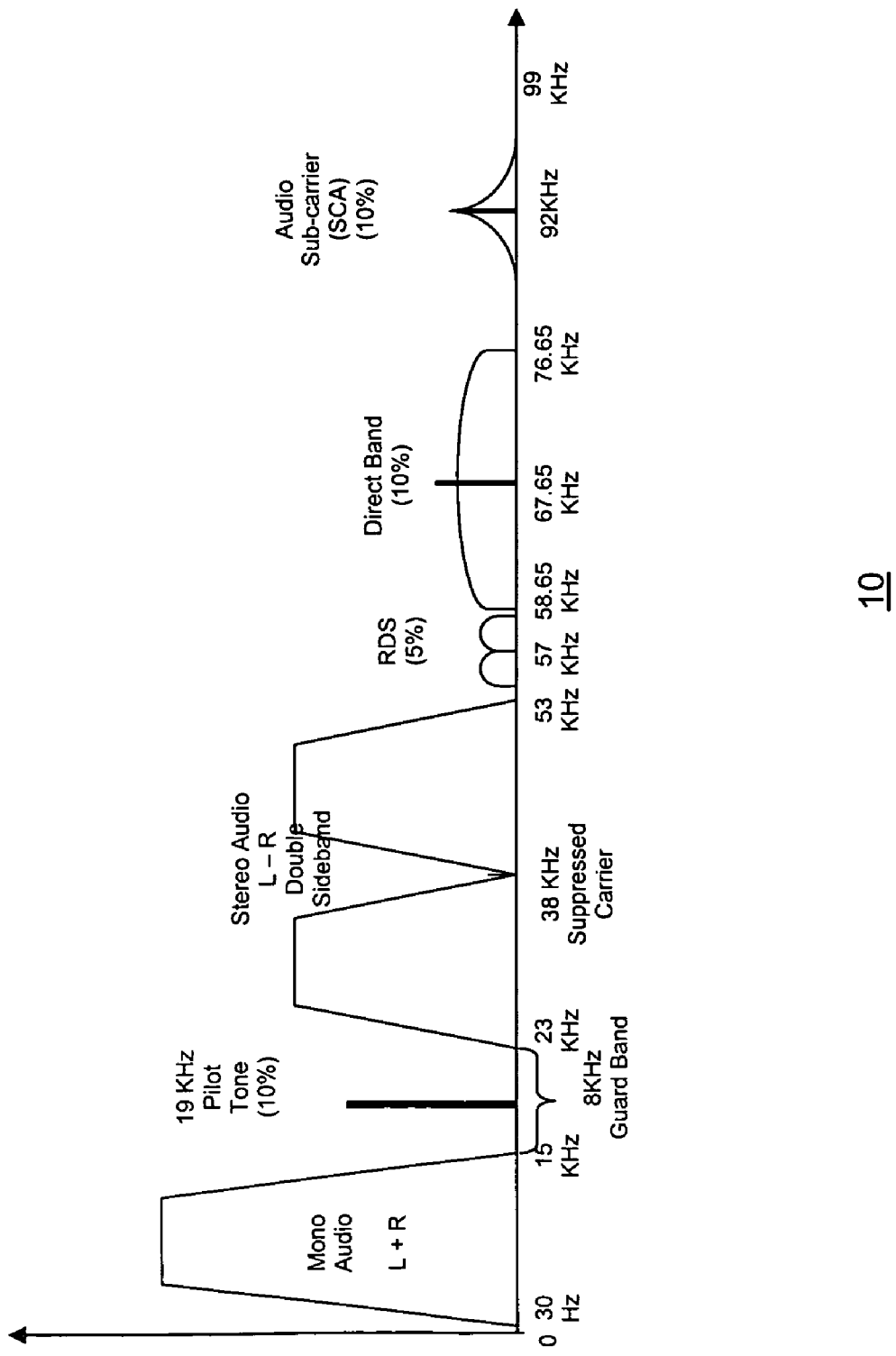
FIG. 1 shows a FM stereo multiplex signal spectrum.

FIG. 1 shows a typical FM stereo multiplexed signal spectrum 10 for an FM broadcast radio station (FM station) with an allocated 100 KHz band. The FM stereo theory is to separate right (R) and left (L) sound track added, as L+R, at base band for mono receiver and multiplexed with double sideband suppressed carrier, as L−R, with the suppressed carrier at 38 KHz. A pilot tone at 19 KHz coherent in phase with 38 KHz carrier is multiplexed in the transmission separately, as depicted in FIG. 1. This provides a clear un-interfered pilot tone carrier to recover the stereo sound of L−R. Multiples of the pilot tone may also be used for radio data systems (RDS) (e.g., 57 KHz) data recovery. Since the pilot tone is phase coherent with the stereo signal, the pilot tone cannot be generated at a local receiver. Each FM stereo station has its own 19 KHz pilot tone phase, which is not synchronized among the FM stations.

According to an implementation of the present invention, a receiving station receives FM signals from three broadcast stations, S1, S2 and S3. In the receiving station, the sinusoidal pilot tone carrier is extracted from the multiplexed FM signals from a first pair of broadcast stations, S1 and S2. The pilot tone phases are then measured and compared to derive the differential distance from two stations, S1 and S2. The difference in phase between two pilot tones (after removing station bias) represents the time-difference-of-arrival (TDOA) of the two stations, S1 and S2. As in LORAN or OMEGA (described above), the constant distance locus between two FM stations S1, S2, is a hyperbolic curve 21 as shown by example calculation 20 in FIG. 2. A similar process is used for the pair of stations S1 and S3. Two pairs of FM pilot tones phase differences 21 are used for a hyperbolic positioning 22 similar to the LORAN or OMEGA navigation system.

As the phases of pilot tone are not synchronized among the FM stations, a receiving reference station (RS) at a known position is used to measure the original station phase bias among the three FM stations, before the pilot tones can be used for positioning. The information from the RS is then used by one or more receiving mobile units (MU), to determine the position of each mobile unit (or mobile station) relative to the reference station (or base station) and/or the FM stations.

The actual differences in phase at the reference station can be computed using actual distances of the base station from each of the FM stations. By subtracting the actual phase difference from the measured phase difference, the original station phase bias is determined. Once the original phase bias is known, it can be subtracted from the mobile unit measured phase difference to derive the actual phase difference at the mobile unit. The actual phase difference is used to determine the mobile unit position.

Figure 3:
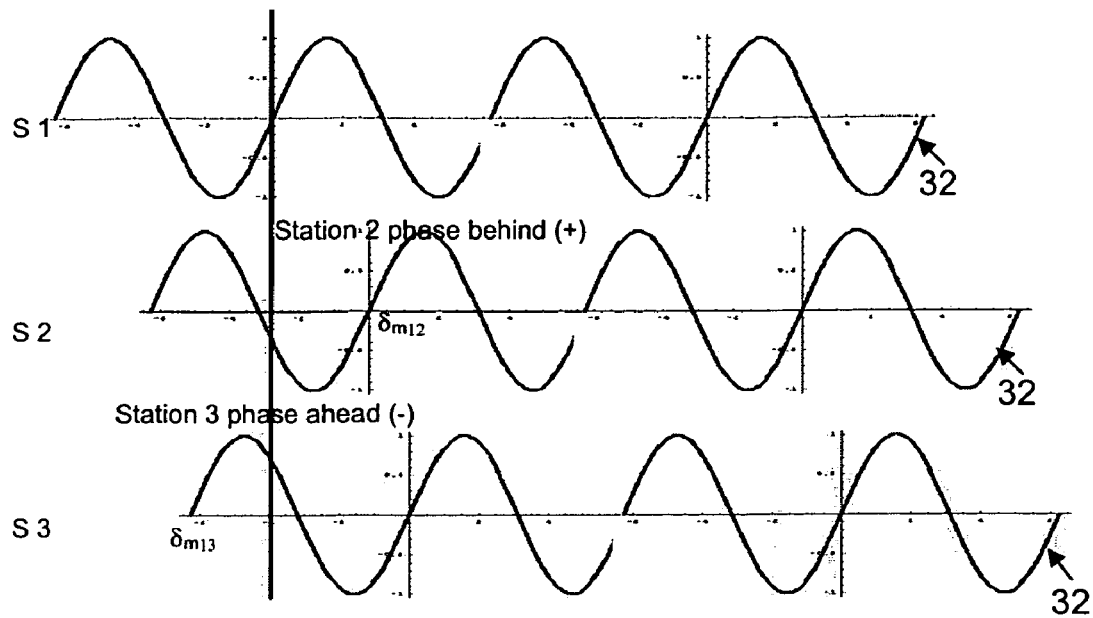
FIG. 3 shows pilot tone phase measurement at a mobile or reference station, according to an embodiment of the invention.

FIG. 3 shows an example phase relationship 30 for pilot tones 32 for the three FM broadcast stations S1, S2, S3. The phase bias can be either delayed (positive) for S2 or ahead (negative) for S3, relative to S1. Therefore, the original phase bias is defined to be ranged between −180 degrees to 180 degrees. The original phase bias can be translated to time or distance to be ranged between ±26.32 μS, or ±7894.74 meters in time or distance, respectively based on 19 KHz pilot tone. The distance is used as phase measurement hereinafter.

From the fixed reference or base station (RS or BS), the actual phase difference (as if FM stations are synchronized) can be computed from a known distance to the FM stations. The phase differences between FM stations can also be measured by an FM pilot tone receiver at RS or BS. Therefore, the original station phase bias for pilot tones from S1, S2 can be determined according to relation (1) below:

Original bias (S1,S2)=Measured phase difference (S1, S2)−Actual phase difference (S1,S2). (1)

At a mobile unit, the original station phase bias (S1, S2) is subtracted from a measured signal phase difference from S1 and S2, to obtain the actual phase difference at the mobile unit for signals from S1, S2, according to relation (2) below:

Actual MU phase difference (S1,S2)=MU measured phase difference (S1,S2)−Original bias (S1,S2). (2)

Similarly for (S1, S3), the original station phase bias for pilot tones from S1, S3 can be determined at fixed BS as:

Original bias (S1,S3)=Measured phase difference (S1, S3)−Actual phase difference (S1,S3).

And, the actual phase difference for signals from S1, S3 at the mobile unit can be determined as:

Actual MU phase difference (S1,S3)=MU measured phase difference (S1,S3)−Original bias (S1,S3).

Figure 2:
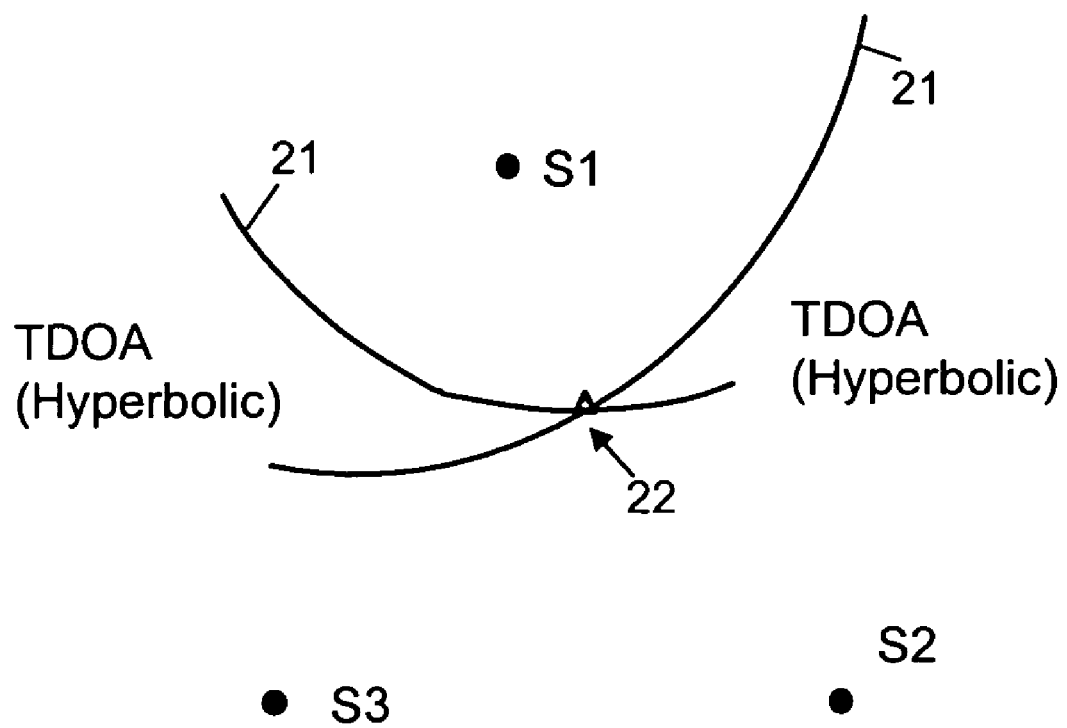
FIG. 2 show hyperbolic navigation using Time Difference of Arrival (TDOA).

The pairs of FM pilot tones actual phase differences at the MU (i.e., Actual phase difference (S1, S2), and Actual phase difference (S1, S3)), are used for a hyperbolic positioning as in FIG. 2. After an integer pilot tone cycle is added, the two-hyperbolic curve intersection 22 provides the position of the MU.

Figure 4:
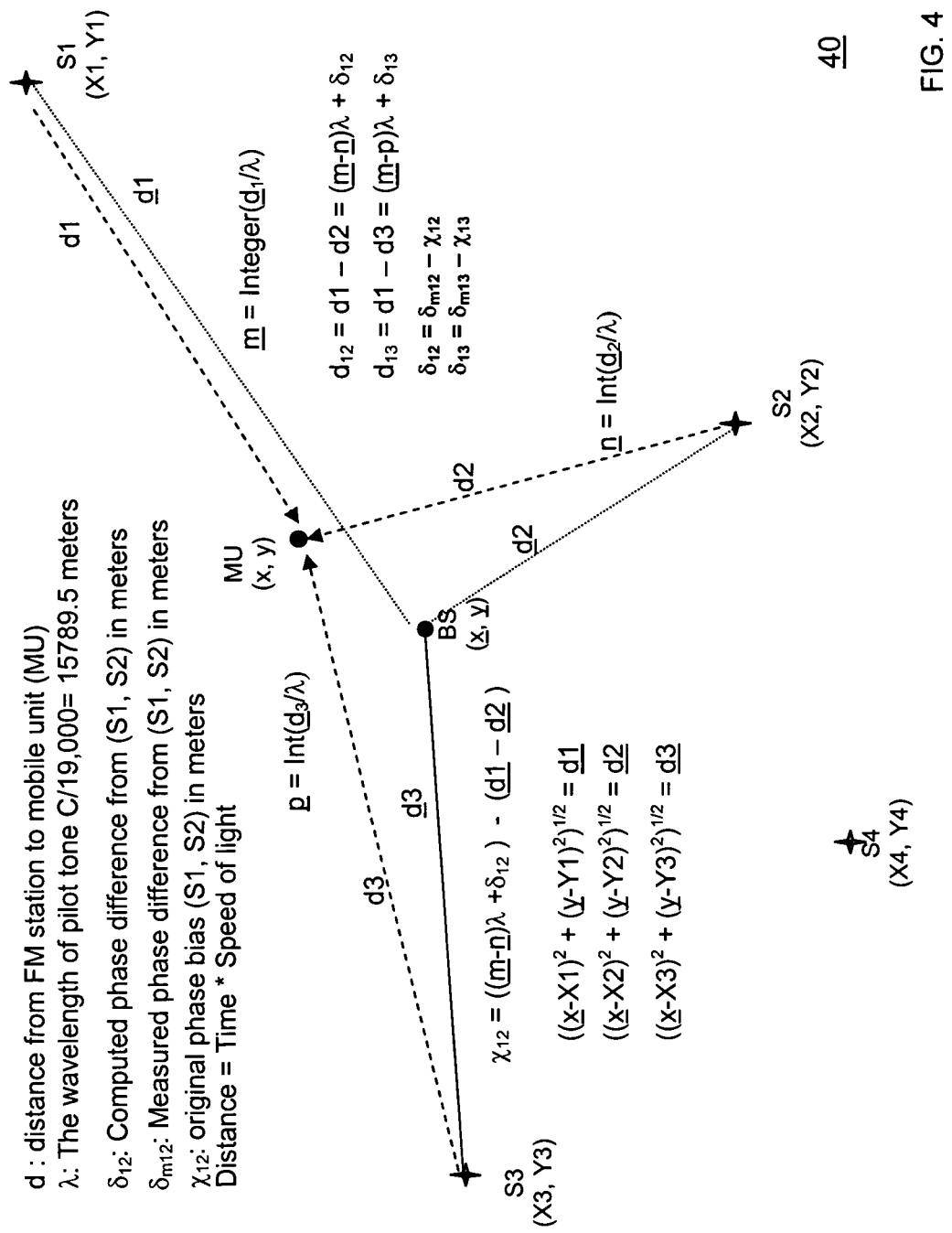
FIG. 4 is a graphical illustration of determining phase bias in unit of distance, according to an embodiment of the invention.

FIG. 4 shows an example two-dimensional coordinate system showing a spatial diagram 40 for determining position of a mobile station MU (i.e., mobile unit), based on FM pilot phase bias determination at a fixed base station BS or RS, according to an embodiment of the invention. Both the base station and the mobile station receive FM broadcast signals from three FM stations, S1, S2, S3. For ease of explanation, the unit of time difference is converted to distance, with the understanding that time multiplied by speed of light equals to the distance.

First the measured phase difference $\underline{\delta}_{m12}$ (the underscore indicates values for BS or RS) at the $\overline{BS}$ is determined as follows: The actual distances $\underline{d1}$ and $\underline{d2}$ from the fixed BS to FM stations, S1 and S2, respectively, are determined from their known latitude and longitude positions. The integer multiples of the pilot tone wavelengths $\underline{m}$ and $\underline{n}$ for $\underline{d1}$ and $\underline{d2}$, respectively, can be derived as:

$\underline{m}$=Integer($\underline{d1}/\lambda$), $\underline{n}$=Integer($\underline{d2}/\lambda$), where $\lambda$ is the pilot tone wavelength of 15,789.5 meters. As such the distances $\underline{d1}$ and $\underline{d2}$ can be represented as:

$\underline{d1}=\underline{m}\lambda+\underline{\delta1}$ $\underline{d2}=\underline{n}\lambda+\underline{\delta2}$ where $\underline{\delta1}, \underline{\delta2}$ are the remainder phases at the BS receiver by subtracting $\underline{m}\lambda$ and $\underline{n}\lambda$ from known distance $\underline{d1}$ and $\underline{d2}$, respectively. A difference between distances $\underline{d1}$ and $\underline{d2}$ provides a computed difference distance (actual TDOA) from the fixed reference station BS as:

$\underline{d1}-\underline{d2}=(\underline{m}-\underline{n})\lambda+\underline{\delta}_{12}$, wherein $\underline{\delta}_{12}=\underline{\delta1}-\underline{\delta2}$ is the computed (or supposed) phase difference between received pilot tones from S1 and S2 at the BS.

In general the distance is not the direct distant between two horizontal points. Broadcast radio stations are typically high up from the ground for radiation gain. The height of a FM station antenna from the sea level is published in station description. The altitude of the receiver can be obtained by a barometric altimeter (which is miniaturized in some applications). The line-of-sight from an FM antenna of a station to a receiver (e.g., from radio station S1 to receiver BS) constitutes an angle θ with respect to a horizontal line from the receiver to station site. Therefore, the ratio of actual line-of-sight (LOS) distance to ground distant is cos θ. For most cases, cos θ approaches unity since the horizontal distance is much greater than the antenna height and θ is near zero. However, if the receiver is near the radio station, the 1/cos θ calibration to LOS must be considered.

The measured TDOA at BS is not the true TDOA, since a FM station bias $\chi_{12}$ between S1 an S2 exists due to non-synchronization among stations. A known position of BS is used to calculate the actual distances from BS to S1, S2, to allow determination of the station bias. As such, relation (1) can be represented as relation (3) below, wherein the original station bias $\chi_{12}$ is obtained from subtracting the actual distances ($\underline{d1}-\underline{d2}$) from measured phase difference $\underline{\delta}_{m12}$ between received pilot tones from S1 and S2 at the $\overline{BS}$ (with ($\underline{m}-\underline{n}$) cycles added), where:

$\chi_{12}=((\underline{m}-\underline{n})\lambda+\underline{\delta}_{m12})-(\underline{d1}-\underline{d2})=\underline{\delta}_{m12}-\underline{\delta}_{12}.$ (3)

The FM station bias $\chi_{13}$ between S1 an S3 can be determined similarly, where:

$\underline{m}$=Integer($\underline{d1}/\lambda$), $\underline{p}$=Integer($\underline{d3}/\lambda$), $\underline{d1}=\underline{m}\lambda+\underline{\delta1}$, $\underline{d3}=\underline{p}\lambda+\underline{\delta3}$, $\underline{d1}-\underline{d3}=(\underline{m}-\underline{p})\lambda+\underline{\delta}_{13}$, $\underline{\delta}_{13}=\underline{\delta1}-\underline{\delta3}$ is the computed phase difference between received pilot tones from S1 and S3 at the *BS*, therefore $\chi_{13}=((\underline{m}-\underline{p})\lambda+\underline{\delta}_{m13})-(\underline{d1}-\underline{d3})=\underline{\delta}_{m13}-\underline{\delta}_{13}.$ To determine the difference of distances $d_{12}$ (TDOA) from the MU to the stations S1 and S2, the phase difference $\delta_{m12}$ between received pilot tones from S1 and S2 is first measured at the MU. Then, m and n integer multipliers of pilot tone wavelengths (15,789.5 meters) from S1, S2 can be estimated by RSS or from the published field strength contour. Since station bias $\chi_{12}$ is already derived from BS as in relation (3), the actual difference $d_{12}$ between distance S1 and S2 at MU can be determined according to relation (4) as:

$d_{12}=d1-d2=(m-n)\lambda+\delta_{m12}-\chi_{12},$ (4)

where $\delta_{12}=\delta_{m12}-\chi_{12}$, such that $d_{12}$ represents the actual difference of distance after $\chi_{12}$ calibrated (true TDOA), wherein $\delta_{m12}$ is measured at MU.

Similarly:

$d_{13}=(m-p)\lambda+\delta_{m13}-\chi_{13}$ (5)

where $\delta_{13}=\delta_{m13}-\chi_{m13}$, such that $d_{13}$ is the actual difference of distance from the MU to stations S1, S3.

The constant distance locus between two stations (two points) is a hyperbolic curve. The two hyperbolic curves will be the constant locus of $d_{12}$ and $d_{13}$, the intersection of the two curves determine the position of the MU. It is also noted that (m−n) λ is called the cycle ambiguity term. From MU, the number of cycles (15,789.5 meter) can be estimated by RSS with reference to the published contour map of the FM station. A rough look-up table of RSS versus wavelength multiplier can be constructed with the help of a published FM contour map. Any ambiguity is not a concern since radio signal attenuated substantially between 15,789.5 meters cycles.

Figure 5:
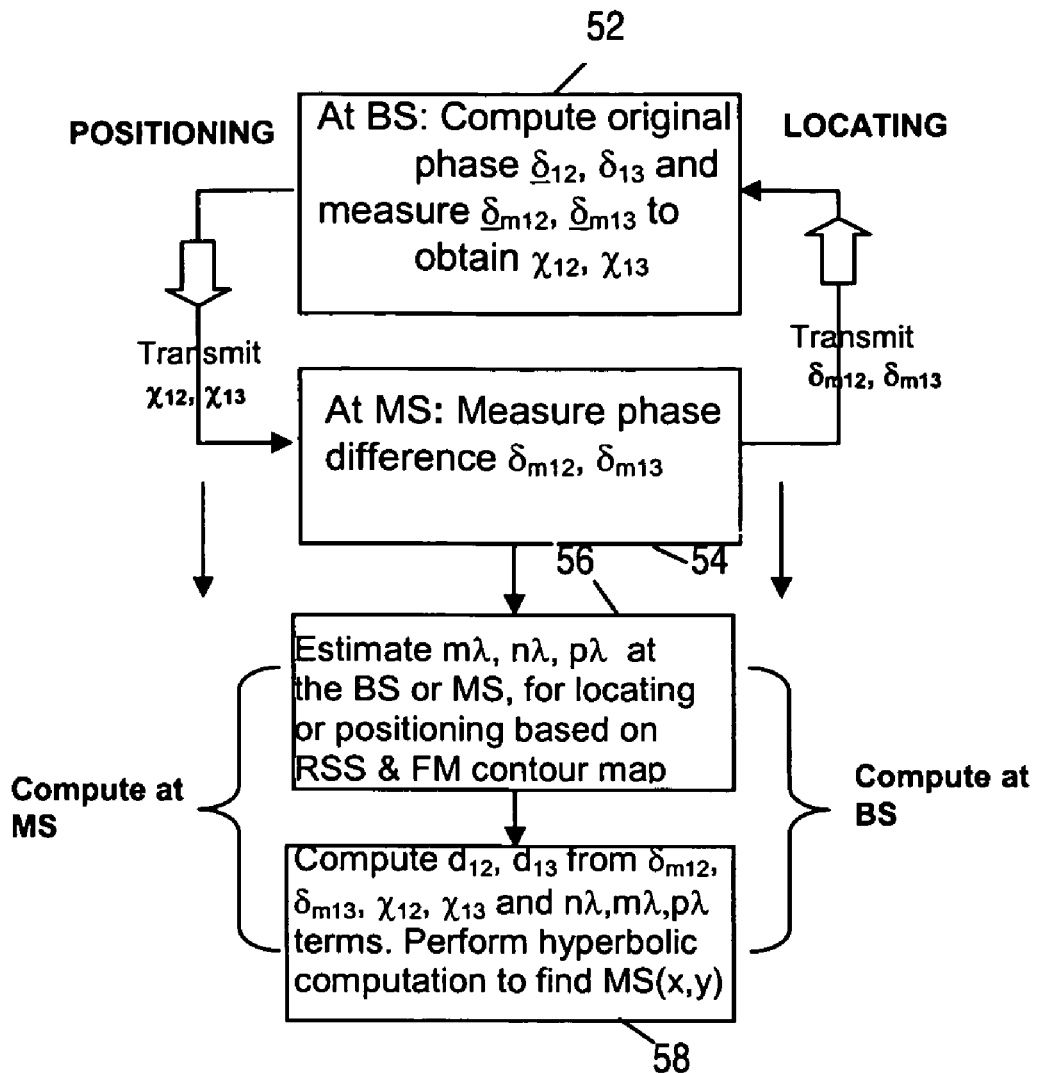
FIG. 5 shows a process of locating a geographical position (i.e., positioning), according to an embodiment of the invention.

As such, referring to the process 50 in FIG. 5, MU position determination using BS station information according to an embodiment of the invention includes:

Block 52: Obtain original phase biases $\chi_{12}$, $\chi_{13}$ from the difference of computed phase $\delta_{m12}$, $\delta_{m13}$ and measured phase $\underline{\delta}_{m12}$, $\underline{\delta}_{m13}$ at BS, and transmit $\chi_{12}$, $\chi_{13}$. Position of the MU can also be determined at the BS, wherein $\chi_{12}$ and $\chi_{13}$ need not be transmitted to the MU.

Block 54: Measure the phase differences $\delta_{m12}$, $\delta_{m13}$ at MU. The values $\delta_{m12}$, $\delta_{m13}$ can be transmitted from the MU to the BS for determining position of the MU.

Block 56: Estimate mλ, nλ (e.g., based on RSS distance formula or table look-up contour map) If m, or n falls on integer wavelength boundary, then (m−1) or (n−1) wavelength can also be tested to find the best fit.

Block 58: Compute $d_{12}$ and $d_{13}$ from relations (4) and (5), then use hyperbolic computation (or use pre-computed hyperbolic/position look-up table) to determine (x, y) for position of MU.

The above steps can be realized with different hardware/software. An implementation using the Kalman Filtering approach of position determination can also be used. According to the invention, positioning accuracy is based on the accuracy of distances from the broadcast FM stations to the BS, and phase measurement precision for $\delta_{m12}$, $\delta_{m13}$, $\underline{\delta}_{m12}$, $\underline{\delta}_{m13}$. The present invention can be applied in many environments including campus or indoor positioning when BS is nearby in hundreds of meters to the MU. For example, an indoor locating system implementing the present invention can be used in a hospital, wherein the BS locates a patient, staff or high value instruments with MU; or an auto dealer uses the BS to locate a car with an MU or monitor the test drive on the neighborhood streets, etc. Table 1 shows example applications.

TABLE 1

Example Applications

| Field of Applications | Effectiveness |
| --- | --- |
| Indoor and Campus Locating | Best Accuracy |
| GPS Dead Reckoning | Best Accuracy |
| E-911 Applications | Accurate |
| Location Based Services | Accurate |
| Asset Tracking & Dispatching | Accurate |
| Auto Theft Prevention | Accurate with references |
| Wide Area Positioning | Accurate with more references |

Figure 6:
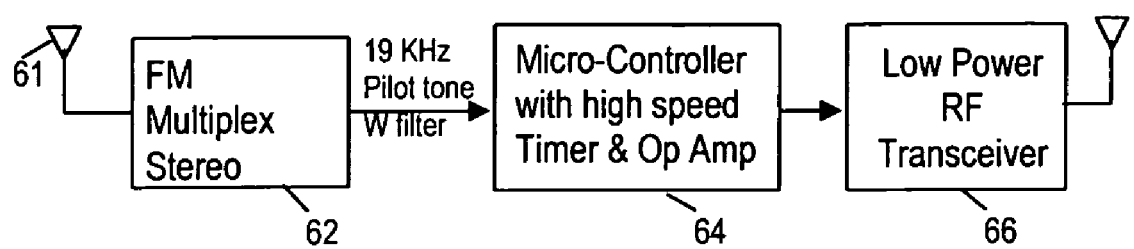
FIG. 6 shows a functional block diagram of a mobile transceiver unit (mobile station), according to an embodiment of the invention.

An example implementation for a campus/indoor locating system is now described. FIG. 6 shows a functional block diagram of an example electronic MU 60 according to the present invention. The MU 60 includes antenna 61, a FM stereo receiver 62, a microcontroller 64 with a high speed timer and operational amplifier, and a local radio frequency (RF) transceiver 66 (RF transceiver could be a FM RDS transceiver). The high speed timer is used for accurate phase measurement. The operational amplifier converts signal sine waves to square waves for phase edge detection.

Figure 7A:
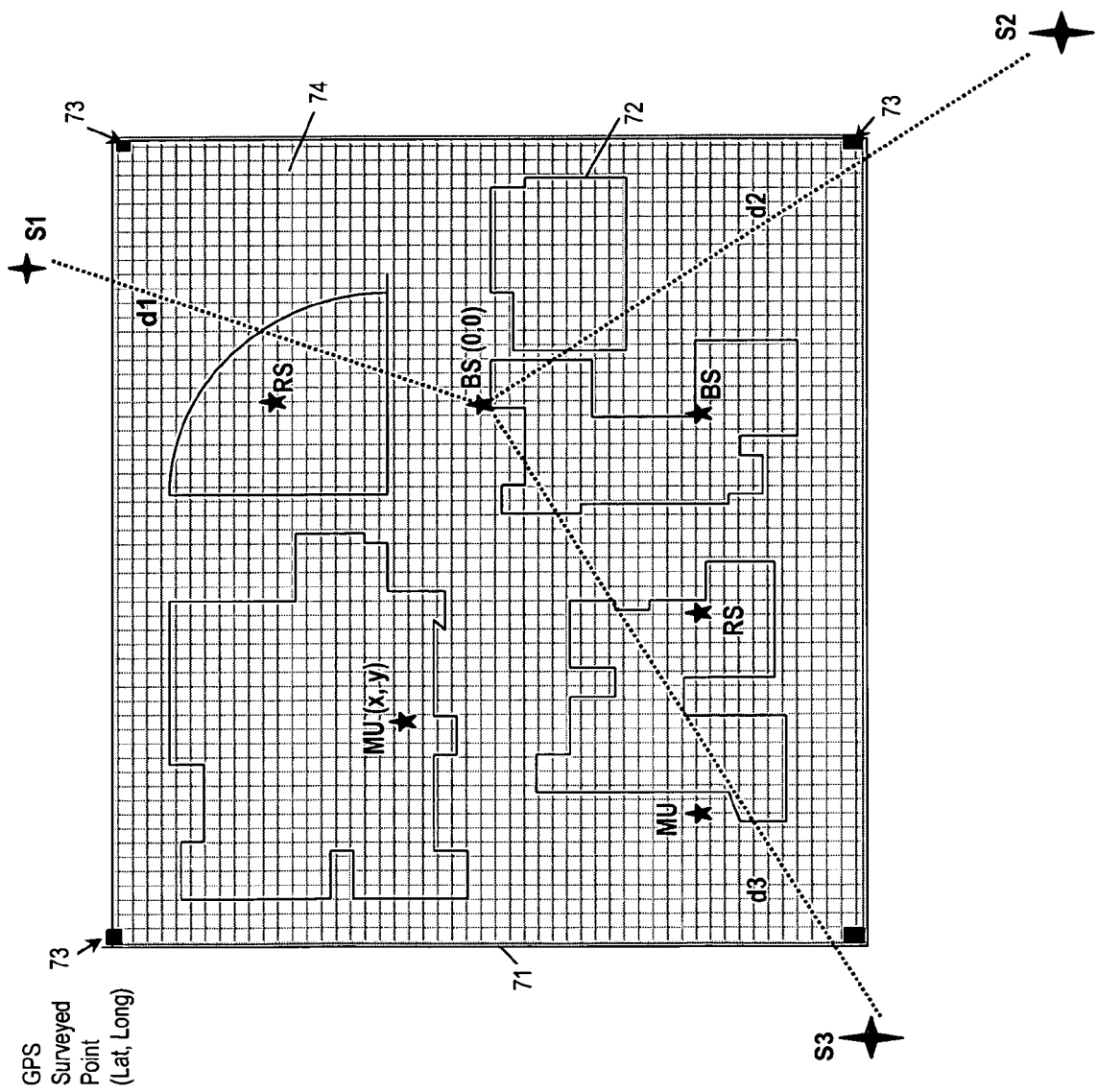
FIG. 7A shows a positioning process in an outdoor campus map with radio station distance shortened for illustration, according to an embodiment of the invention.

As noted, the MU 60 can be used in conjunction with a BS in an indoor environment or an outdoor campus. FIG. 7A shows a campus map 70 showing campus buildings 72, a fixed BS, a mobile MU and optionally one or more fixed reference stations (RS), wherein each RS may comprise a BS without a map display and human interface. The BS, MU and RS received FM broadcast signal from the FM broadcast stations S1, S2 and S3.

A grid 71 is superimposed on campus buildings 72 where the grid includes multiple square grid blocks providing resolution points 74. A representation of the grid 71 is maintained in the memory of the MU and BS. Higher resolution grid may be possible, which will require more memory.

Each grid block or point is indicated by a grid coordinate (x, y) starting from BS coordinate at (0, 0) for convenience. From the BS, the coordinates are incremented in both positive and negative integers to the maximum extent needed to cover the entire building or campus. With known GPS surveyed reference points 73 in corners of the building or campus, the geo-location of each grid point 74 at a coordinate (x, y) can be predetermined at site preparation by interpolation using plot map dimension and stored in computer memory.

From relations (4) and (5) above, the values $d_{12}$, $d_{13}$ can be predetermined in site preparation from all coordinate points (x, y) in the campus to the stations S1, S2, S3 in longitude and latitude coordinates. Since geographical position of each grid point is known, the computation of $d_{12}$, $d_{13}$ is the same as BS or RS. Using the calculated wavelengths m, n and p, the difference of distance from S1, S2, S3 for all BS, RS and grid points can be pre-computed at the site survey in the same manner:

$d_{12} = (m-n)\lambda + \delta_{12}$ for all grid points $d_{13} = (m-p)\lambda + \delta_{13}$ for all grid points $\underline{d}_{12} = (\underline{m}-\underline{n})\lambda + \underline{\delta}_{12}$ for the BS and RS $\underline{d}_{13} = (\underline{m}-\underline{p})\lambda + \underline{\delta}_{13}$ for the BS and RS.

Since BS and MU are nearby, (m−n)λ and (m−n)λ values for BS and MU, respectively, are essentially the same. The same goes for $d_{13}$ and $\underline{d}_{13}$. If it is in the wavelength boundary (i.e., the MU and BS are near integer wavelength from radio station), then (m−n)λ and (m−n)λ can be mandated to use the same value, and force the remainder bear in the phase shift $\delta_{12}$ at MU and the phase shift $\underline{\delta}_{12}$ at the BS.

Double Differencing Techniques for Indoor or Campus Positioning

This invention introduce a double differencing technique especially effective for indoor and campus positioning application. The double differencing from grid points relative to BS or RS is defined as $$\Delta d_{12} = d_{12} - \underline{d}_{12} = \delta_{12} - \underline{\delta}_{12}, \text{ and similarly } \Delta d_{13} = d_{13} - \underline{d}_{13} = \delta_{13} - \underline{\delta}_{13} \quad (6)$$

The values $\Delta d_{12}$ and $\Delta d_{13}$ are defined as double differencing from grid points with respect to BS or RS. In relation (6), the cycle ambiguity terms (m−n)λ, (m−n)λ, (m−p)λ, (m−p)λ, and the original station phase bias terms $\chi_{12}$ and $\chi_{13}$, are cancelled out and become immaterial after double differencing. The double differencing effect will improve the position accuracy tremendously. It is also noted that $\Delta d_{12}$, $\Delta d_{13}$ are typically small values which increase with increasing distance between the MU and the BS (0, 0). The computed double differencing values $\Delta d_{12}$, $\Delta d_{13}$, for each grid points relative to BS or RS are stored in computer memory for indoor or campus positioning applications later. To determine the location/position of the MU, first the values ($\delta_{m12} - \underline{\delta}_{m12}$) and $(\delta_{m13}-\underline{\delta}_{m13})$ similar to relation (6) are determined to obtain $\Delta d_{m12}, \overline{\Delta d}_{m13}$, from which MU coordinate (x, y) is obtained as described herein.

Figure 7B:
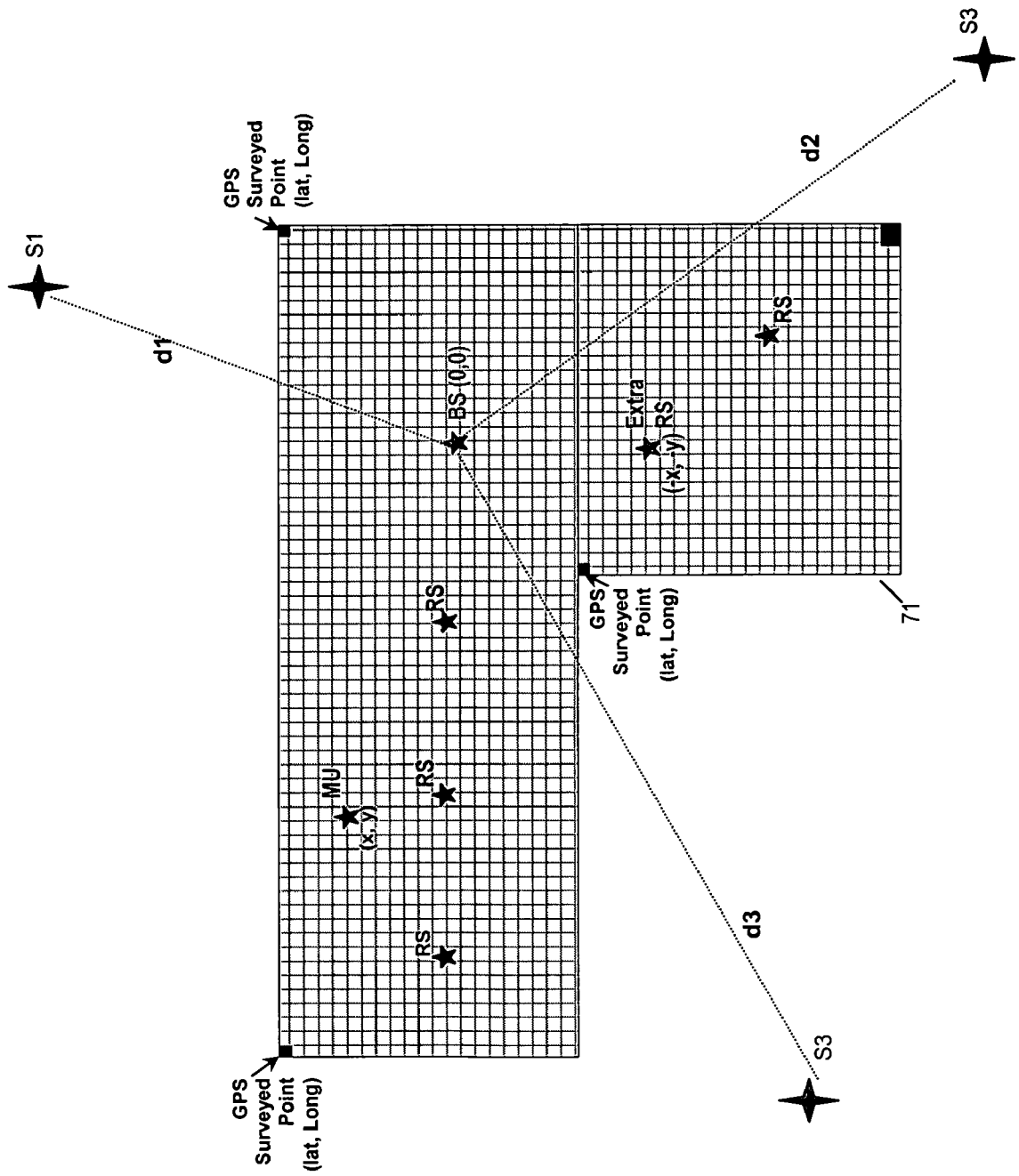
FIG. 7B shows a positioning process in an indoor area with radio station distance shortened for illustration, according to an embodiment of the invention.

For indoor locating systems, the MU need not include a plot map or know its position. However, for other applications, a map and MU position may be desirable at the MU. In such a case, the map in the form of said grid, can be downloaded to the MU from the BS, and the MU position can be determined and provided by the BS to the MU at every position fix. The MU includes a universal interface for accessing information/services from a nearby BS (or RS). FIG. 7B shows another example map 75, according to the present invention. In case of a reinforced concrete building or secured building with metal structure, as depicted by example map 77 in FIG. 7C, the incoming FM signals from the broadcast station S1, S2, S3 may be relayed through the wall to indoor BS and MU using repeaters 78. In that case, an additional phase difference for pilot tones due repeaters is determined as $\delta_{12}=d1-d2$, $\delta_{13}=d1-d3$, for new $\chi'_{12}$ and $\chi'_{13}$ correction as $\chi'_{12}=\chi_{12}+\delta_{12}$ and $\chi'_{13}=\chi_{13}+\delta_{13}$. After the correction, hyperbolic triangulation is performed from the three points on the grid where the repeaters operate.

Figure 7C:
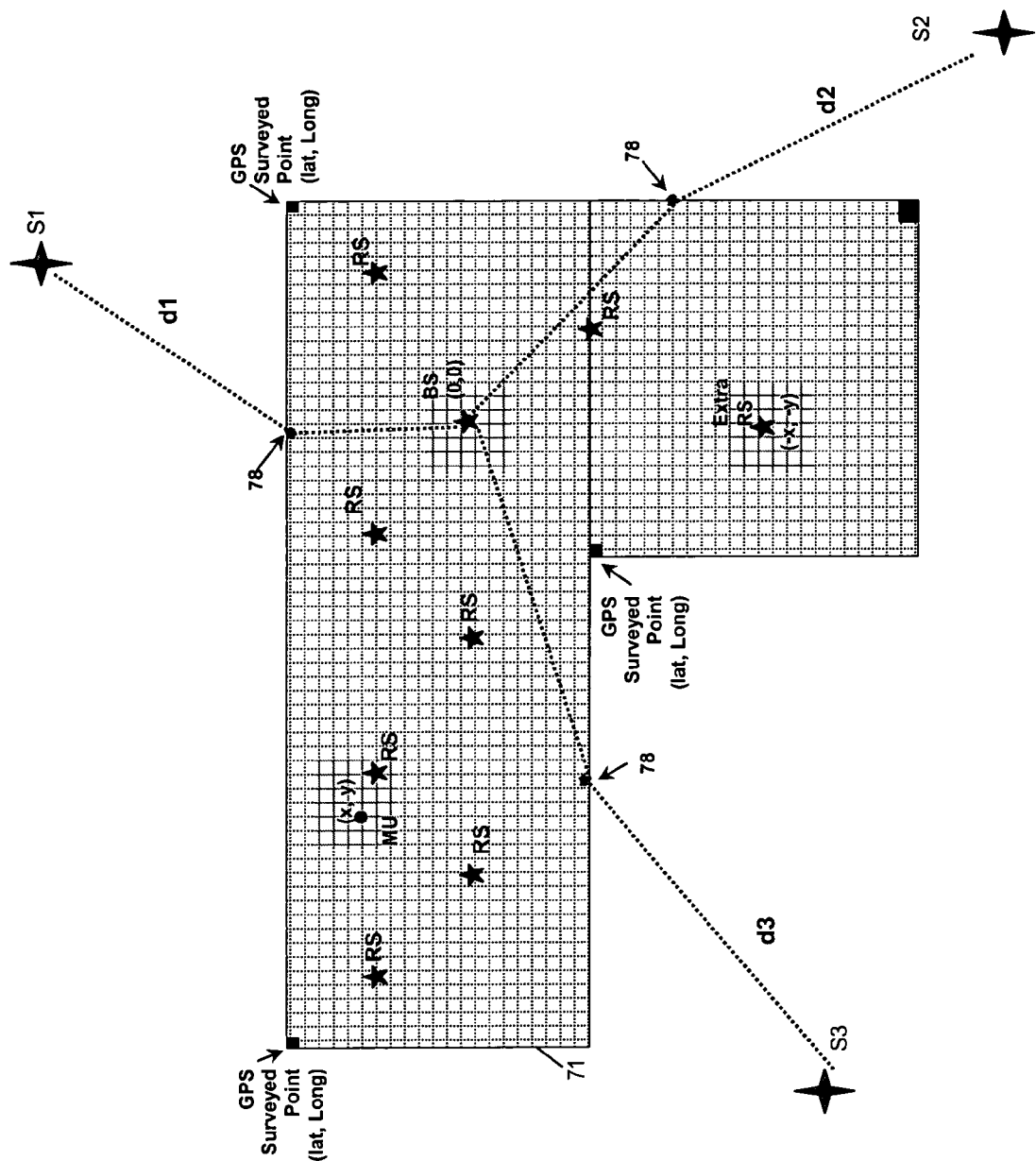
FIG. 7C shows a positioning process for an indoor map using indoor repeaters, according to an embodiment of the invention.

Another example implementation inside a reinforced concrete building can be described using the same map as in FIG. 7C, using three or more low power FM transmitters at position 78, instead of repeating FM broadcasting signal. Typical low power FM transmitters operate at unlicensed FM power bands (i.e., not requiring a governmental operating license) such as that permitted under U.S. Federal Communication Commission (FCC) part 15 regulation (e.g., power measured at 3 meters from transmitter must be under 250 µV/m strength). The transmitters can use any other frequency band permitted by FCC. In addition, the pilot tone from these three transmitters can be other than 19 KHz, in sine wave or other periodical waveform.

In FIGS. 7A-C, the extra reference stations function as base stations, and allow more precision in determining position of the MU. A BS or RS nearer an MU can provide information which allows more accurate determination of position of the MU due to similarity of radio wave in close proximity. This also allows lower transmission power consumption at the BS, RS and MU transceivers. The BS, RS and MU may use similar FM hardware and antenna to prevent difference in phase measurement due to different hardware. Lower cost FM receivers for RS is used. When RS is used, the BS can monitor the difference of the RS measured bias $\chi_{12}$ and $\chi_{13}$, wherein the difference can be calibrated at the BS computation. The RS and MU have no difference in FM receiver hardware. The fixed position of the RS is known to BS for radio station distance computation. If the campus is large and out of reach of BS in transceiver RF range, multiple BS can be employed. Therefore, there can be several configurations, including for example: Single BS and one or more multiple MU; Single BS with one or more RS and one or more MU; Multiple BS with one or more RS and one or more MU; etc.

Site Preparation with Known Broadcast FM Radio Station Positions

Figure 8:
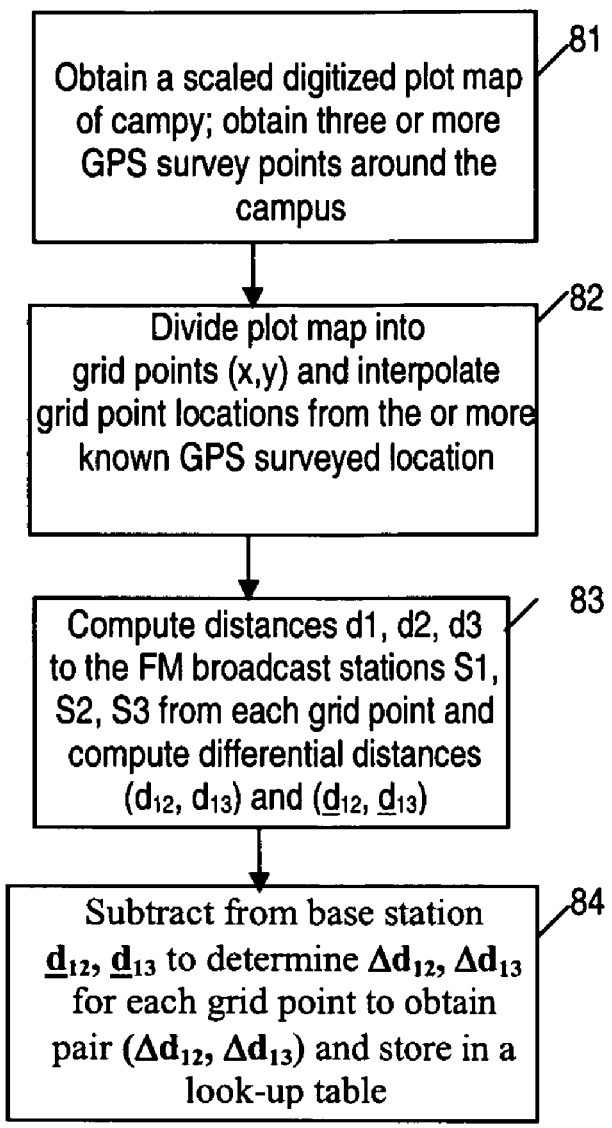
FIG. 8 shows a site preparation with known radio station locations, for positioning, according to an embodiment of the invention.

An example implementation involves using site preparation steps for e.g., indoor or campus applications. The site preparation simplifies locating an MU. If there are multiple MU units, hyperbolic computation at the BS may demand high speed processing. Site preparation allows pre-computation of relevant values for a site, and storing of the pre-computed values in a look-up table for access. Table look-up is a much faster operation than computation, at the expense of memory. FIG. 8 shows an example site preparation process 80 using with knowledge of location of radio stations S1, S2, S3, and described below in conjunction with the map for FIG. 7A, including:

Block 81: Obtain a digitized indoor or campus map of subject application. Determine one or more GPS survey points on the campus or indoor map.

Block 82: Use GPS surveyed reference points 73 on campus (at the corners for ease of interpolation), together with a plot map 70 with actual dimensions, interpolate all the grid points (x, y) with latitude and longitude coordinate for distance computation to radio stations S1, S2, S3 (also in latitude, longitude coordinates).

Block 83: Compute the distances d1, d2, d3 from each grid point (x, y) to the three defined radio station S1, S2, S3. Subtract the distances d1, d2 and d1, d3 to obtain two pairs of differential distances as $(d_{12}, d_{13})$, respectively, for each grid coordinate point, and for the BS position as $(\underline{d}_{12}, \underline{d}_{13})$. Subtract the BS differential distance $(\underline{d}_{12}, \underline{d}_{13})$ from each pair of coordinate differential distances $(\overline{d}_{12}, d_{13})$ to obtain the double differencing pair $(\Delta d_{12}, \Delta d_{13})=(d_{12}-\underline{d}_{12}, d_{13}-\underline{d}_{13})$ for each grid coordinate point (x, y).

Block 84: Each $(\overline{x}, y)$ grid point then has a corresponding value $(\Delta d_{12}, \Delta d_{13})$, which can be e.g., in the form of an address look-up table in a memory at the BS for locating the MU.

The operations for locating the MU position based on the computations at the BS and MU, and the table look-up, for a site prepared according to the above steps, will be described in a later section.

Site Preparation without Knowledge of Broadcast FM Radio Station Positions

Figure 9:
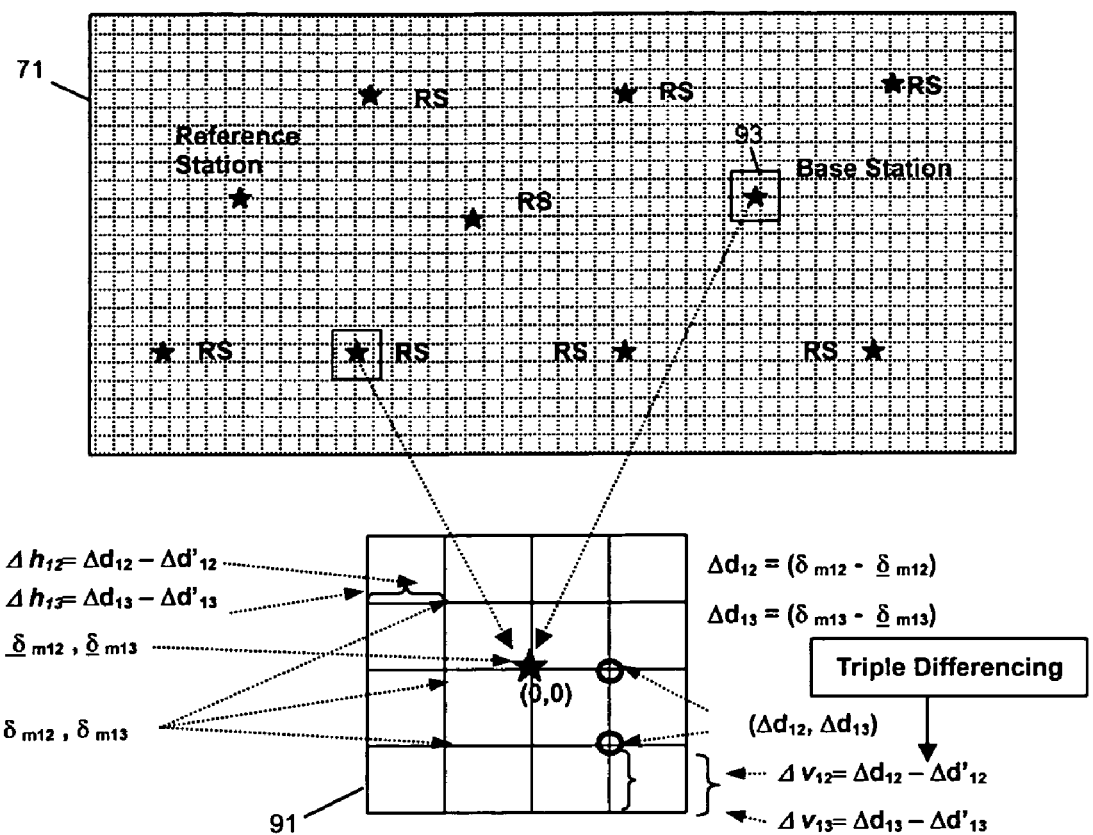
FIG. 9 shows a simplified site preparation diagram without knowledge of radio station locations, for positioning, according to an embodiment of the invention.

In general, the hyperbolic position technique follows a non-linear equation. The difference pair $(\Delta d_{12}, \Delta d_{13})$ does not increment linearly from grid point to grid point. However, since the campus size is a relatively small area compared to several miles or tenth of miles from the radio stations, the increment will be approximately linear in such a small area. From the above reasoning, an alternative site preparation technique can be used when the radio station positions are not precisely known. However, the approximate direction of the signal and strength is known to be useful for triangulation. FIG. 9 diagramatically illustrates an example simplified site preparation process 90, without requiring knowledge of the radio station positions, according to the present invention. The campus map 70 is divided by grid points with appropriate resolution (meters).

Triple Differencing for Grid to Grid Double Differencing

In another embodiment, the invention provides a triple differencing technique for simplified positioning to avoid table look-up: One can start from the BS or RS to make either an N×N grid (e.g., N=5), as depicted in the enlarged section 91 in FIG. 9, with a conventional Cartesian coordinate digital map with grid. Then value pairs $(\Delta d_{12}, \Delta d_{13})$ are determined for finite grid positions using measured double differencing: $\Delta d_{12}=(\delta_{m12}-\underline{\delta}_{m12})$ and $\Delta d_{13}=(\delta_{m13}-\underline{\delta}_{m13})$. Next, the difference of measurement pairs $(\Delta d_{12}, \Delta \overline{d}_{13})$ of consecutive grid points are subtracted horizontally and vertically (triple differencing) to obtain $\Delta h_{12}=\Delta d^{n}_{12}-\Delta d^{n-1}_{12}$, and $\Delta v_{12}=\Delta d^{n}_{12}-\Delta d^{n-1}_{12}$ (where the superscript indicates current and previous grid points, $\Delta h_{12}$ and $\Delta v_{12}$ represent horizontal and vertical grid difference pairs). $\Delta h_{13}$ and $\Delta v_{13}$ are obtained similarly. In one example where N=5, when 20 pairs of horizontal and vertical differences are determined, each for the 5×5 grid, these triple differences $(\Delta h_{12}, \Delta v_{12}, \Delta h_{13}, \Delta v_{13})$ can be used to solve double differencing pairs $(\Delta d_{12}, \Delta d_{13})$, if the grid differences $\Delta h$ and $\Delta v$ are uniform.

If the differences are not uniform, then gradual difference interpolation can be used. If the differences are gradually increasing or decreasing, a non-linear interpolation equation is used with the differences. When constructing a look-up table of ($\Delta d_{12}$, $\Delta d_{13}$) values for each grid coordinate (x, y), either RS or BS can be used as the point of origin (0,0). The look-up table can be smaller, originating from either multiple RS or BS positions, which partition the entire grid 71 into smaller grid sections 93. Using the gradual differences interpolation, a smaller look-up table of ($\Delta d_{12}$, $\Delta d_{13}$) can be interpolated. The size of the look-up table depends on the number of RS and the largest coordinate grid area to reach from BS or RS origin (0,0). This provides an efficient method of site preparation when GPS survey is not available. The look-up table is partitioned into regions covered by the BS or RS. However, if the grid differences $\Delta h_{12}$ $\Delta v_{12}$ are essentially uniform, interpolation is unnecessary since the average differences can be used to find a solution of two linear equations described below.

Simplified Positioning without Table Look-Up by Solving Two Linear Equations

Let the MU measurement double differencing pairs relative to BS or RS be $\Delta d_{12}$, $\Delta d_{13}$. Then the measurement pairs $\Delta d_{12}$, $\Delta d_{13}$ must be a multiple combination of averaged triple grid differences $\overline{\Delta h_{12}}$, $\overline{\Delta v_{12}}$, $\overline{\Delta h_{13}}$, $\overline{\Delta v_{13}}$, respectively, to locate the MU position. Therefore, the multiplier in horizontal and vertical direction can be x, and y. The linear equations to solve x and y multipliers become:

$$\Delta d_{12} = x\overline{\Delta h_{12}} + y\overline{\Delta v_{12}},$$

$$\Delta d_{13} = x\overline{\Delta h_{13}} + y\overline{\Delta v_{13}}.$$

This is a problem of two linear equations to solve two variables (x, y). Therefore, with essentially uniform (linear) grid increments in double differencing, linear equation can be used to solve for the MU position without a table look-up. In most cases if locating precision is not required with centimeter accuracy, the linear equation approximation and solution becomes a simplified locating approach without table look-up.

Figure 10:
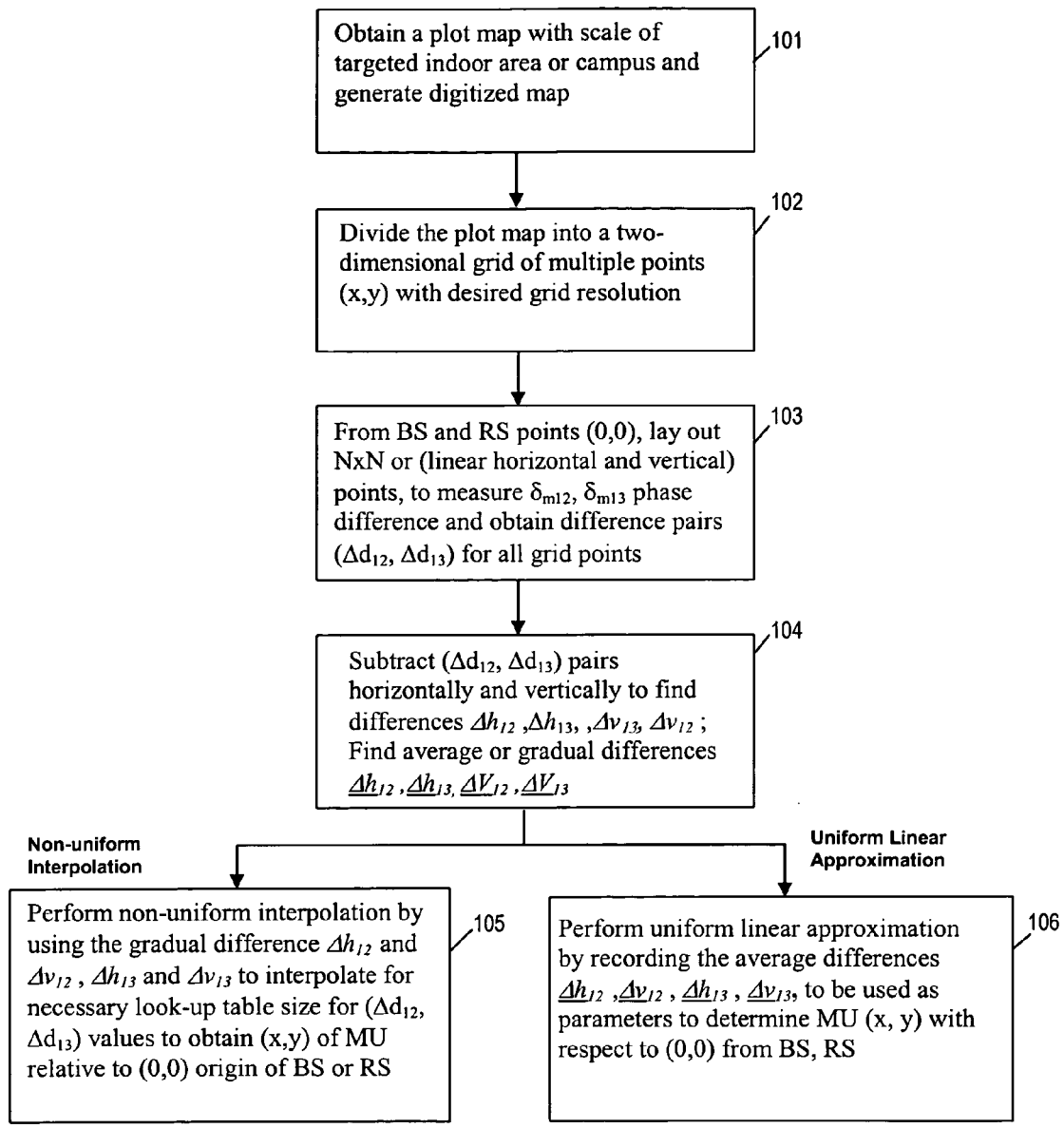
FIG. 10 shows a simplified site preparation process without knowledge of radio station locations, for positioning, according to an embodiment of the invention.

FIG. 10 shows the steps of site survey (site preparation) process 100 without knowledge of FM station positions, according to the present invention, including:

Block 101: Obtain a plot map with scale of targeted indoor area or campus and generate digitized map with a plot map grid.

Block 102: Divide the plot map into a two-dimensional grid of multiple grid points (x,y) with desired grid resolution.

Block 103: From BS or RS points (0,0), lay out N×N or (linear horizontal and vertical) points, to measure $\delta_{m12}$, $\delta_{m13}$ phase difference and obtain difference pairs ($\Delta d_{12}$, $\Delta d_{13}$) for all grid points according to FIG. 9.

Block 104: Subtract ($\Delta d_{12}$, $\Delta d_{13}$) pairs horizontally and vertically to find triple grid differences $\Delta h_{12}$, $\Delta h_{13}$, $\Delta v_{13}$, $\Delta v_{12}$. Find average differences $\overline{\Delta h_{12}}$, $\overline{\Delta h_{13}}$, $\overline{\Delta v_{12}}$, $\overline{\Delta v_{13}}$ according to FIG. 9.

Block 105: When the consecutive differences are non-uniform, perform non-uniform interpolation by using the gradual difference $\Delta h_{12}$ and $\Delta v_{12}$, $\Delta h_{13}$ and $\Delta v_{13}$ to interpolate for necessary look-up table for ($\Delta d_{12}$, $\Delta d_{13}$) values to obtain (x,y) of MU relative to (0,0) origin of BS or RS.

Block 106: When the consecutive differences are essentially uniform (or centimeter precision is not demanded), perform uniform linear approximation by recording the average differences $\overline{\Delta h_{12}}$, $\overline{\Delta v_{12}}$, $\overline{\Delta h_{13}}$, $\overline{\Delta v_{13}}$, to be used as parameters to determine MU (x,y) with respect to (0,0) by solving two linear equations.

The operations for locating the MU position based on the measurements at the BS and MU, and the table look-up obtained from site preparation according to the above steps, are described further below.

Locating Operation in a Site Prepared with Known Broadcast FM Radio Station Positions In the following, the operations for locating an MU in relation to a BS within a site (e.g., campus, indoor environment), prepared by the above-mentioned site preparation process with known broadcast FM radio station position, are described. The operations begin with performing phase measurements for $\delta_{m12}$, $\delta_{m13}$ at the MU and phase measurements for $\overline{\delta_{m12}}$, $\overline{\delta_{m13}}$, at the BS or RS. The phase measurement at BS or RS may be different from that when site preparation was performed, however, the differential ($\sim\Delta d_{12}$, $\sim\Delta d_{13}$) remains essentially the same. Next, the difference values $\delta_{m12} - \overline{\delta_{m12}}$ and $\delta_{m13} - \overline{\delta_{m13}}$ are obtained, to form a double differencing pair ($\delta_{m12} - \overline{\delta_{m12}}$, $\delta_{m13} - \overline{\delta_{m13}}$) pair for the look-up table generated during site preparation. This allows us to find a best match (x, y) grid for the MU, based on the following approximation from relation (6) above, where:

$$\Delta d_{12} \sim (\delta_{m12} - \overline{\delta_{m12}}), \Delta d_{13} \sim (\delta_{m13} - \overline{\delta_{m13}}) \quad (7)$$

The pair ($\Delta d_{12}$, $\Delta d_{13}$) is then used to look up the best match (x,y) entry in the look-up table for locating the position of the MU. The measurements ($\delta_{m12} - \overline{\delta_{m12}}$, $\delta_{m13} - \overline{\delta_{m13}}$) is best matched to the pair ($\Delta d_{12}$, $\Delta d_{13}$) at grid point $(\overline{x,y})$. Furthermore, a least square approximation may be used to minimize error for best match by searching the neighborhood 4 grid points. This yields the best match position accuracy at grid resolution. Finer precision calculation is described further below.

Better position accuracy can be obtained by fitting the value $(\delta_{m12} - \overline{\delta_{m12}})$ and $(\delta_{m13} - \overline{\delta_{m13}})$ between values ($\Delta d_{12}$, $\Delta d_{13}$) of four grid points by neighborhood search. Then, a weighted linear interpolation of the four neighboring grid points can be used for finer resolution rather than forcing the solution to best match grid point.

Figure 11A:
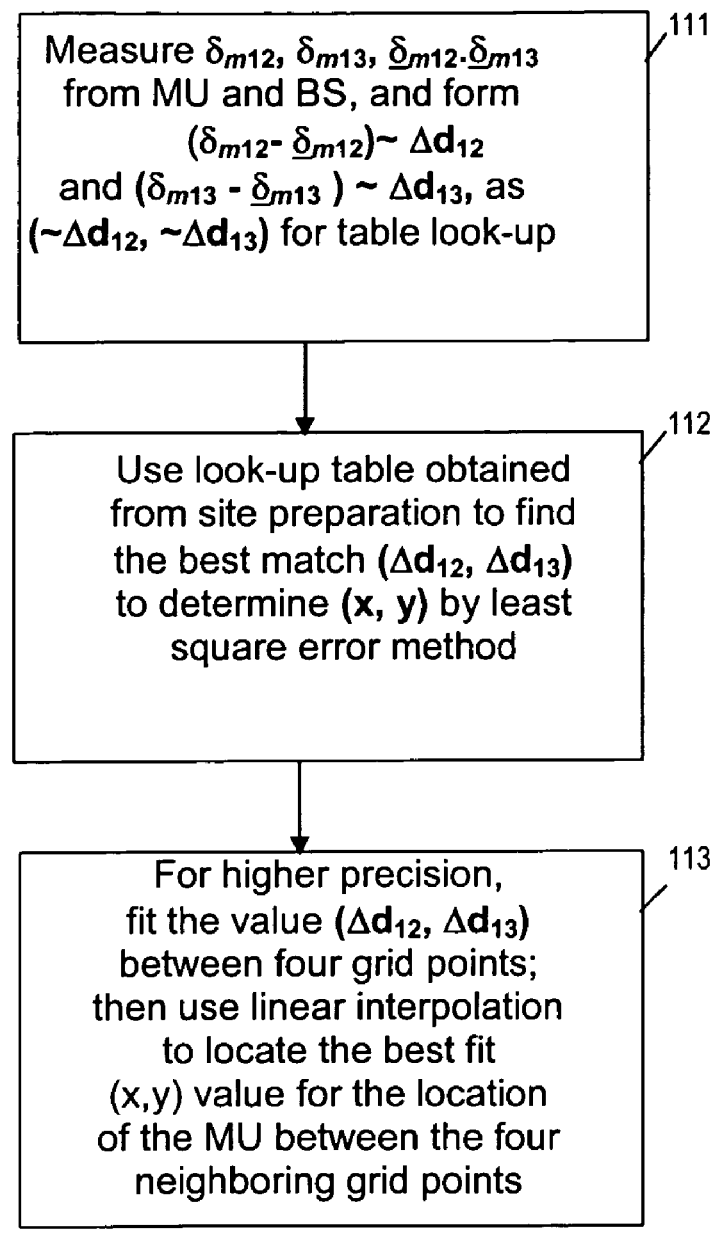
FIG. 11A shows an indoor positioning process, according to an embodiment of the invention.

FIG. 11A summarizes the above operations as a process 110 including the following blocks:

Block 111: Measure $\delta_{m12}$, $\delta_{m13}$, $\overline{\delta_{m12}} \cdot \overline{\delta_{m13}}$ from MU and BS, and form $(\delta_{m12} - \delta_{m13}) \sim \Delta d_{12}$ and $(\overline{\delta_{m12}} - \overline{\delta_{m13}}) \sim \Delta d_{13}$, as ($\sim\Delta d_{12}$, $\sim\Delta d_{13}$) for table look-up.

Block 112: Use look-up table obtained from site preparation to find the best match ($\Delta d_{12}$, $\Delta d_{13}$) to determine (x,y) by least square error method.

Block 113: For higher precision, fit the value ($\Delta d_{12}$, $\Delta d_{13}$) between four grid points; then use linear interpolation by difference ratios to determine (x,y) value for the location of the MU between the four neighboring grid points.

Locating precision can be improved by closeness of MU to RS, and measuring accuracy of phase differences ($\delta_{m12} - \overline{\delta_{m12}}$) and ($\delta_{m13} - \overline{\delta_{m13}}$) improved by proximity to RS.

Locating Operation in a Site Prepared with Unknown Broadcast FM Radio Station Positions (Simplified Site Preparation)

In the following, the operations for locating an MU in relation to a BS within a site (e.g., campus, indoor environment), prepared by the above-mentioned simplified site preparation process with unknown broadcast FM radio station position, are described in FIG. 9, where RS is used as (0,0) origin if MU is nearby for position accuracy. The operations include measuring the phase difference values $\delta_{m12}$, $\delta_{m13}$ at the MU and values $\overline{\delta_{m12}}$, $\overline{\delta_{m13}}$ at the BS or RS. The RS position is fixed and measurement is transmitted to BS frequently for MU proximity check. Then, the values $\delta_{m12} - \overline{\delta_{m12}}$ and $\delta_{m13}-\underline{\delta}_{m13}$ are used to form a pair $(\delta_{m12}-\underline{\delta}_{m12}, \delta_{m13}-\underline{\delta}_{m13})$ for table look-up. The table was obtained from site preparation previously without knowledge of FM station positions. The pair $(\delta_{m12}-\underline{\delta}_{m12}, \delta_{m13}-\underline{\delta}_{m13})$ is used to determine $(\Delta d_{12}, \Delta d_{13})$, where $(\delta_{m12}-\underline{\delta}_{m12})\sim\Delta d_{12}$, $(\delta_{m13}-\underline{\delta}_{m13})\sim\Delta d_{13}$.

The pair $(\Delta d_{12}, \Delta d_{13})$ is used for look-up in the table to find a best match (x, y) grid for the MU by searching 4 neighbors with least square error. Or more precision is obtained using 4 grid points interpolation described previously.

Since the measurements $\underline{\delta}_{m12}, \underline{\delta}_{m13}$ of RS is transmitted to BS frequently, the MU measurements $\delta_{m12}, \delta_{m13}$ are compared to RS values at the BS for proximity check (using nearest value and/or highest received RSSI received from MU). Then RS can be used as the origin (0,0). Using the measurement pair $(\sim\Delta d_{12}, \sim\Delta d_{13})$ and the best match RS, a look-up operation is performed to find the (x, y) position relative to the RS origin (0,0).

For uniform linear approximation, two linear equations to solve the (x, y) coordinate with MU measurement difference pairs input $(\Delta d_{12}, \Delta d_{13})$ is described as:

$$\Delta d_{12}=x\underline{\Delta h}_{12}+y\underline{\Delta v}_{12}$$

$$\Delta d_{13}=x\underline{\Delta h}_{13}+y\underline{\Delta v}_{13}.$$

Therefore, using averaged triple grid differences $\underline{\Delta h}_{12}, \underline{\Delta h}_{13}, \underline{\Delta v}_{12}, \underline{\Delta v}_{13}$ from site preparation and measured difference pairs $\Delta \overline{d}_{12}, \Delta d_{13}$ obtained, the MU coordinate (x, y) can be uniquely determined without table look-up. In addition (x, y) could be non-integers solution.

Figure 11B:
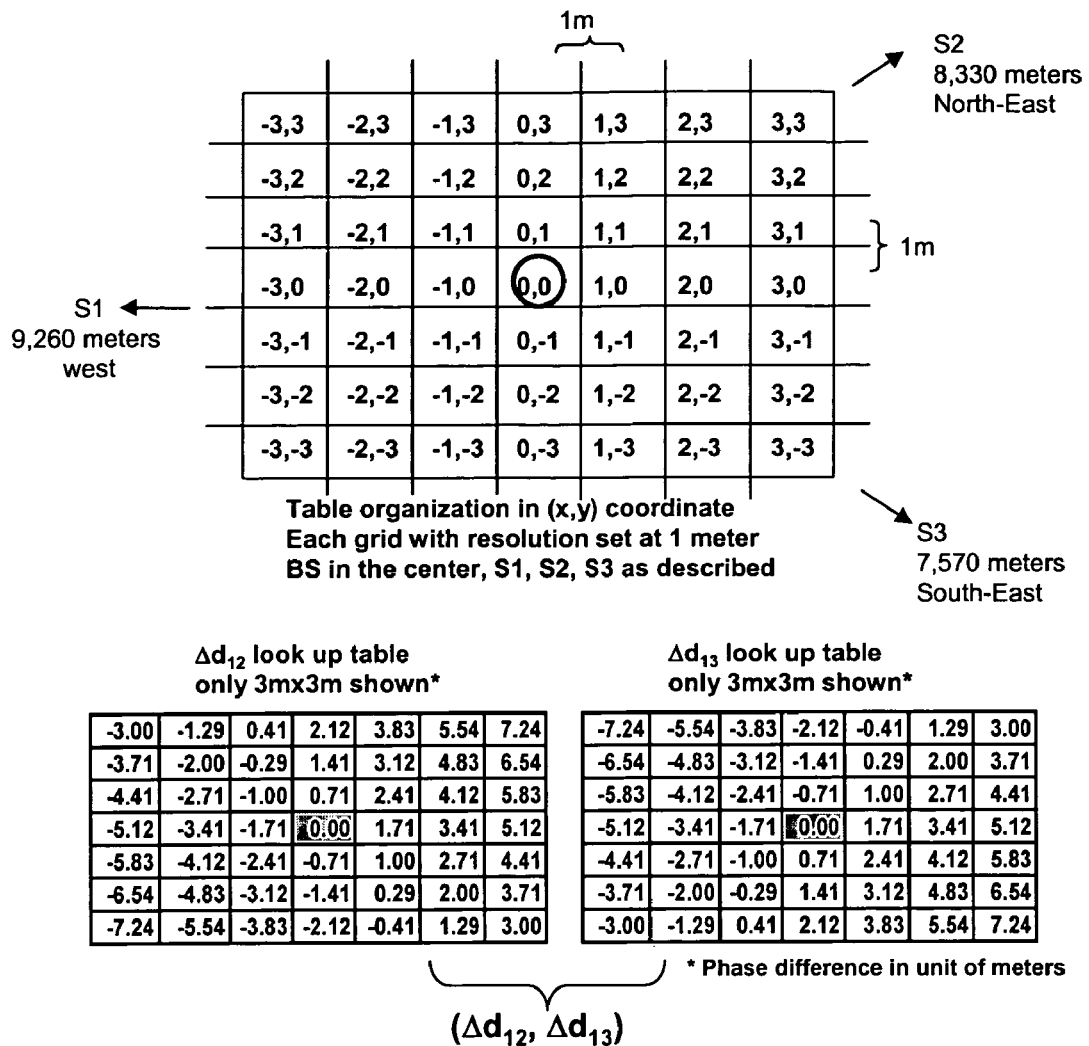
FIG. 11B shows a position look-up table, for positioning, according to an embodiment of the invention.

An example partial look-up table of $(\Delta d_{12}, \Delta d_{13})$ is shown in FIG. 11B. In this simple example, it is observed that average horizontal increment $\underline{\Delta h}_{12}$ and $\underline{\Delta h}_{13}$ are uniformly 1.71 meters and average vertical increment $\underline{\Delta v}_{12}, \underline{\Delta v}_{13}$ are uniformly 0.71 and −0.71 meters respectively, with only last digit truncation error of 0.01 m observed. Therefore, with measured differentials $\Delta d_{12}$, $\Delta d_{13}$ and two equations $\Delta d_{12}=x\Delta h_{12}+y\Delta v_{12}$, $\Delta d_{13}=x\Delta h_{13}+y\Delta v_{13}$, then x and y coordinates can be uniquely solved for the position of MU with respect to BS. Table look-up operation becomes unnecessary due to local linearization of parabolic curve.

Figure 12:
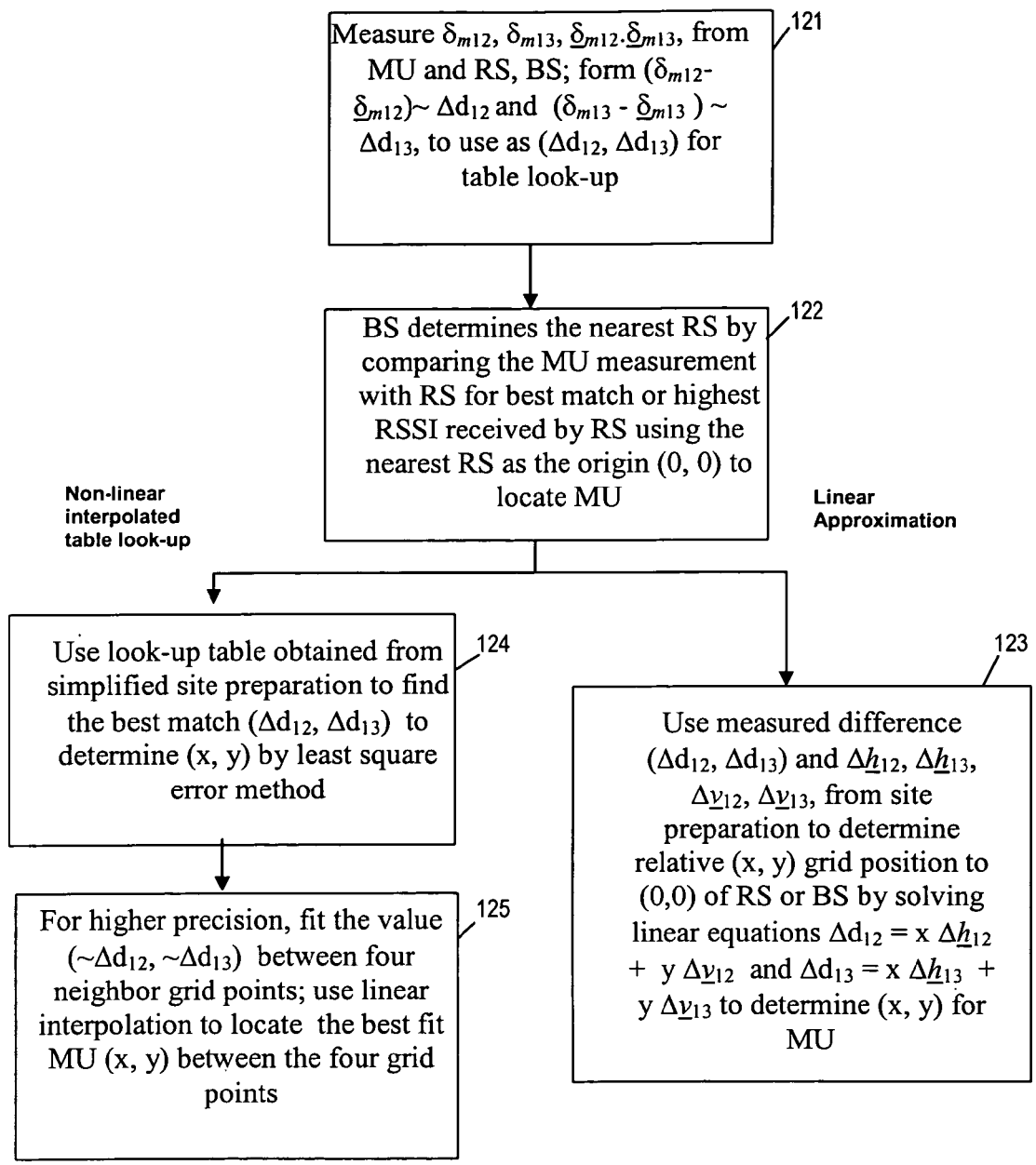
FIG. 12 shows a process for simplified indoor positioning, according to an embodiment of the invention.

FIG. 12 summarizes the above operations as a process 120 including the following blocks:

Block 121: Measure $\delta_{m12}, \delta_{m13}, \underline{\delta}_{m12}\cdot\underline{\delta}_{m13}$, from MU, RS and BS; form $(\delta_{m12}-\underline{\delta}_{m12})\sim\Delta\overline{d}_{12}$ and $(\delta_{m13}-\underline{\delta}_{m13})\sim\Delta d_{13}$, to be used as $(\Delta d_{12}, \overline{\Delta} d_{13})$ for table Block 122: BS determines the nearest RS by comparing the MU measurement with RS for best match with highest RSSI received by RS using the nearest RS as the origin (0, 0) to locate MU.

Block 123: For linear approximation solution for MU coordinate (x, y), using measured difference $(\Delta d_{12}, \Delta d_{13})$ and $\underline{\Delta h}_{12}, \underline{\Delta h}_{13}, \underline{\Delta v}_{12}, \underline{\Delta v}_{13}$, from site preparation to determine relative (x, y) grid position relative to (0,0) of RS or BS by solving linear equations $\Delta d_{12}=x\Delta h_{12}+y\Delta v_{12}$ and $\Delta d_{13}=x\Delta h_{13}+y\Delta v_{13}$ to determine x, y for MU.

Block 124: For non-linear interpolated table look-up, use look-up table obtained from simplified site preparation to find the best match $(\Delta d_{12}, \Delta d_{13})$ to determine (x, y) by least square error method.

Block 125: For higher precision, fit the value $(\sim\Delta d_{12}, \sim\Delta d_{13})$ between four neighbor grid points; use linear interpolation by ratio to locate the best fit MU (x, y) between the four grid points.

GPS Dead Reckoning Application

Figure 13:
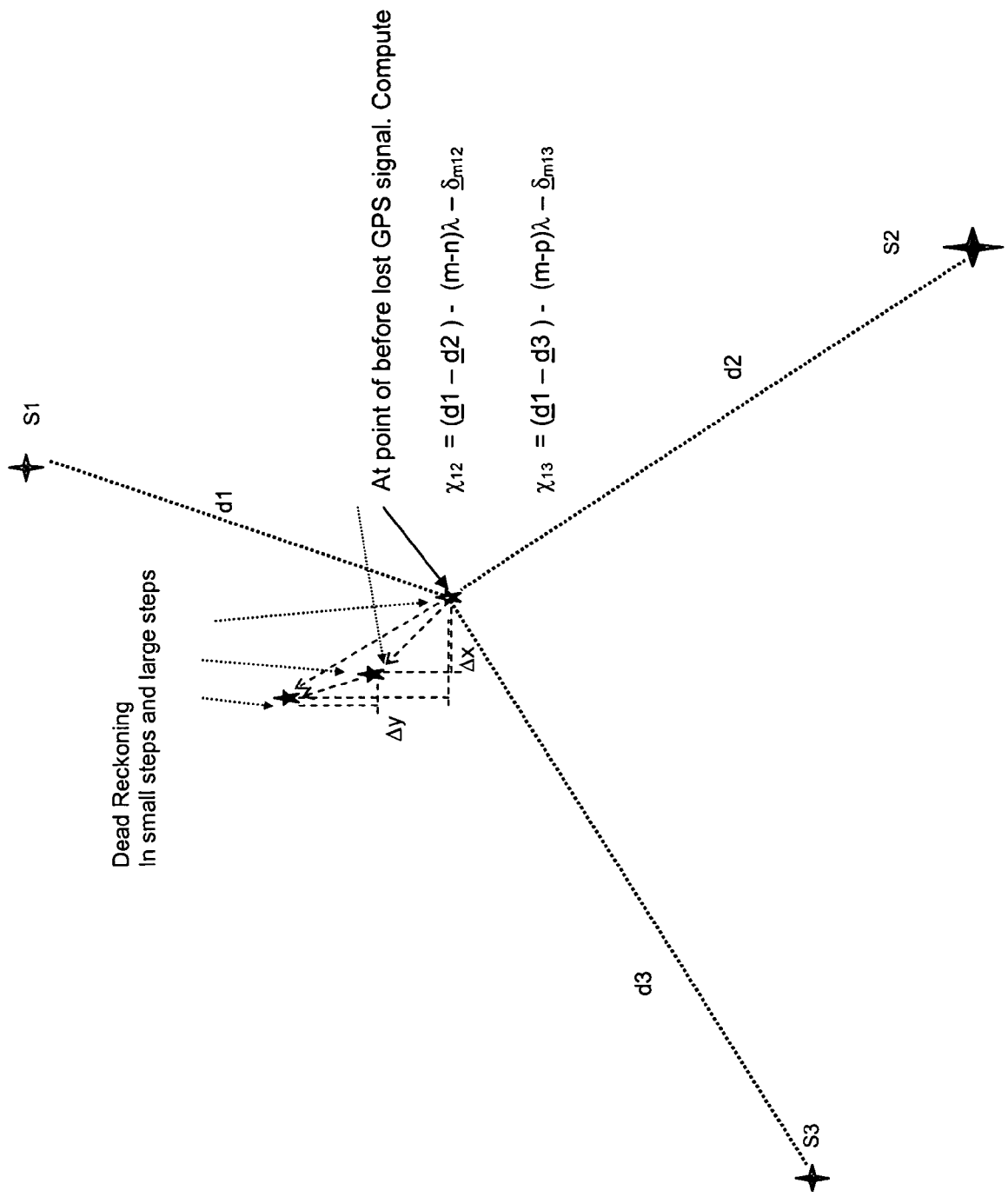
FIG. 13 is a diagrammatic illustration of positioning process using GPS dead reckoning augmentation with FM multiplex stereo signals, according to an embodiment of the invention.

The present invention can further be applied to GPS dead reckoning augmentation. Dead reckoning may be used in GPS when GPS satellite-in-view is less than 4 in urban canyon or indoors. An example two-dimensional application of GPS dead reckoning for automobile or handheld GPS receiver is discussed below in relation to example calculation 130 in FIG. 13. Each star/asterisk mark in FIG. 13 represents a position fix at dead reckoning. An FM stereo receiver and microcontroller are installed in the GPS receiver with interface to GPS receiver and dead reckoning FM stereo receiver as depicted in FIG. 14B. When dead reckoning may be required (GPS-in-view is marginally 4), the FM stereo receiver is turned on and functioning in parallel with GPS. The FM stereo receiver performs phase measurements at the MU at each GPS position fix and performs testing for step-by-step dead reckoning accuracy. The result is compared to actual GPS position fixes, making calibration to the prediction matrix of a Kalman Filter, to be discussed later. The micro-controller determines $\chi_{12}$ and $\chi_{13}$ at each position fix:

$$\chi_{12}=((m-\underline{n})\lambda+\delta_{m12})-(\underline{d1}-\underline{d2}),$$

$$\chi_{13}=((m-\underline{p})\lambda+\delta_{m13})-(\underline{d1}-\underline{d3})$$

where d1, d2, d3 are computed with known GPS position and three FM broadcast radio stations S1, S2, S3. The values $\delta_{m12}, \delta_{m13}$ are the phase difference measurements, and m, n, p are determined by d1, d2, d3, as described previously. At the last point before GPS lost position fix (called point of departure), the two hyperbolic difference $d_{12}, d_{13}$ can be computed by measuring $\delta_{m12}, \delta_{m13}$ at the last GPS position known, where:

$$d_{12}=d1-d2=(m-n)\lambda+(\delta_{m12}-\chi_{12})$$

$$d_{13}=d1-d3=(m-p)\lambda+(\delta_{m13}-\chi_{13})$$

wherein it is assumed that (m−n) λ does not change from the point of departure of GPS. If the location is at the boundary of integer wavelength, the term (m−n) λ can be forced to a constant and let the measurement $\delta_{m12}$ bear the remainder. The last known GPS position is the reference point for dead reckoning defined as point of departure. If the GPS signal position fix reappears, the process will reset to normal GPS receiving. Position fix interval for dead reckoning can be the same as GPS (normally 1 sec.), but it is usually at a higher rate. The point of GPS departure is used for all dead reckoning position reference to avoid error propagation. In general, the reference from point of departure is more accurate since step-by-step locating may accumulate error in each step. However, Kalman filtering need not remember the point of departure measurement other than station biases: $\chi_{12}, \chi_{13}$. $\Delta x$ and $\Delta y$ in FIG. 13 represent differential motion in x and y direction, respectively, and the triangles represent motion displacement projected in x and y coordinates.

The accuracy of dead reckoning depends on the phase measurement accuracy and closeness to the point of departure. With $d_{12}, d_{13}$ available for hyperbolic position fix, several techniques can be used. Two well known techniques are Kalman Filtering and direct least square fit at each new estimated position. The calibrated measurement pair $(d_{12}, d_{13})$ is a text book input for Kalman filtering. Defining the current measurement position as $X_k=(x_k, y_k)$ as a position vector, and measurement vector $Z_k=(d_{12}, d_{13})$, then the Kalman prediction equation from k−1 to k can be represented as:

$$X_k=AX_{k-1}+w_{k-1}$$

and the measurement vector can be represented as:

$$Z_k=HX_k+v_k$$

where w is the prediction error noise vector, v is the measurement noise vector, and A and H are Kalman filter matrices. The step-by-step solutions to the Kalman equation are well documented in the literature. The main spirit of dead reckoning operation is to use point of GPS departure to compute phase biases $\chi_{12}$, $\chi_{13}$, and using these phase biases together with new measurement $\delta_{m12}$, $\delta_{m13}$ to obtain the differences measurement pair $Z_k=(d_{12}, d_{13})$ for the Kalman equation.

It is noted that a velocity vector is not in the position vector equation for simplicity of low dynamic dead reckoning, since the measurement $Z_k$ can be performed at 10 Hz or higher rate. For example, if the MU is traveling at 36 km per hour, the measurement is made at 1 meter interval at 10 Hz rate. Then, the velocity vector can be derived from the position difference divided by one tenth of a second. A slower sampling rate can be used with a more complicated Kalman filtering matrix by defining position and velocity vector as $X_k=(x_k, y_k, x'_k, y'_k)$, where x' and y' denote the velocity in x and y directions, and by defining the measurement vector to be $Z_k=(d_{12}, d_{13}, d'_{12}, d'_{13})$.

Simplified Dead Reckoning when Radio Station Positions are Unknown

In the Kalman filter measurement vector $Z_k=(d_{12}, d_{13})$, the double difference defined in equation (6) can be used as $Z_k=(\Delta d_{12}, \Delta d_{13})$ measurement vector, where $\Delta d_{12}=d^n{}_{12}-d^{(n-1)}{}_{12}$. It is defined as the difference of consecutive measurement of distance difference, or phase measurement difference $\delta_{m12}$, $\delta_{m12}$. The advantage is that (m−n)λ and the original phase biases $\chi_{12}$, $\chi_{13}$ drop out as described in relation (6) above. The implication of using the double differencing vector is that if the exact radio station position is unavailable to the GPS dead reckoning device, and the three radio stations S1, S2, S3, are known to provide suitable HDOP (good triangulations), the dead reckoning can still be performed with step-by-step double difference of phase measurement difference, $\delta_{m12}$, $\delta_{12}$. This process is termed blind dead reckoning with availability of the phase difference measurement among three radio station, but without knowing the exact position of radio stations S1, S2, S3.

Figure 14A:
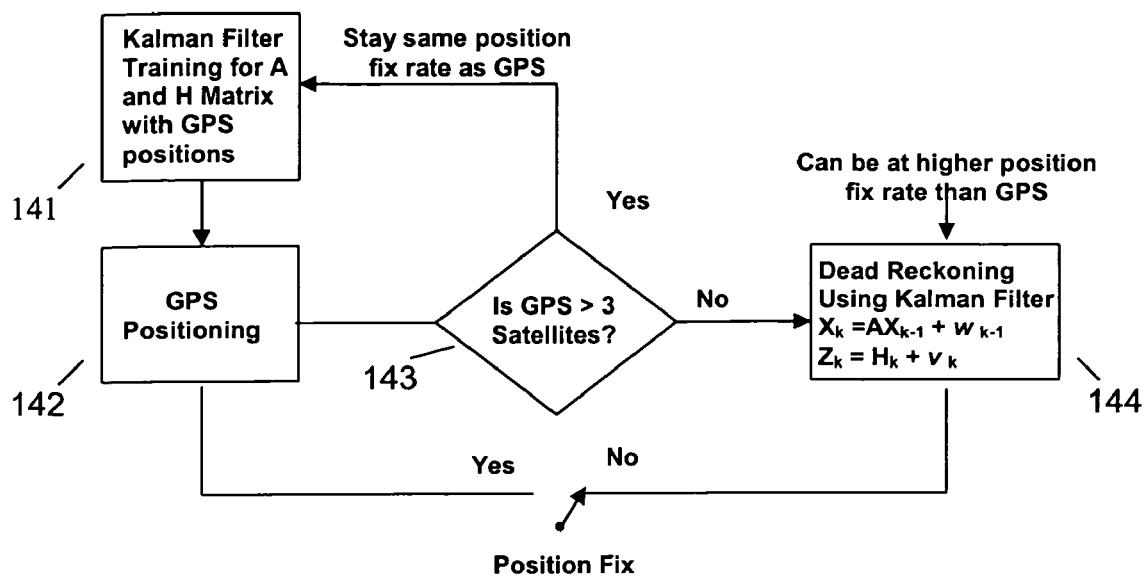
FIG. 14A shows a positioning process using GPS and dead reckoning and FM signals, according to an embodiment of the invention.
Figure 14B:
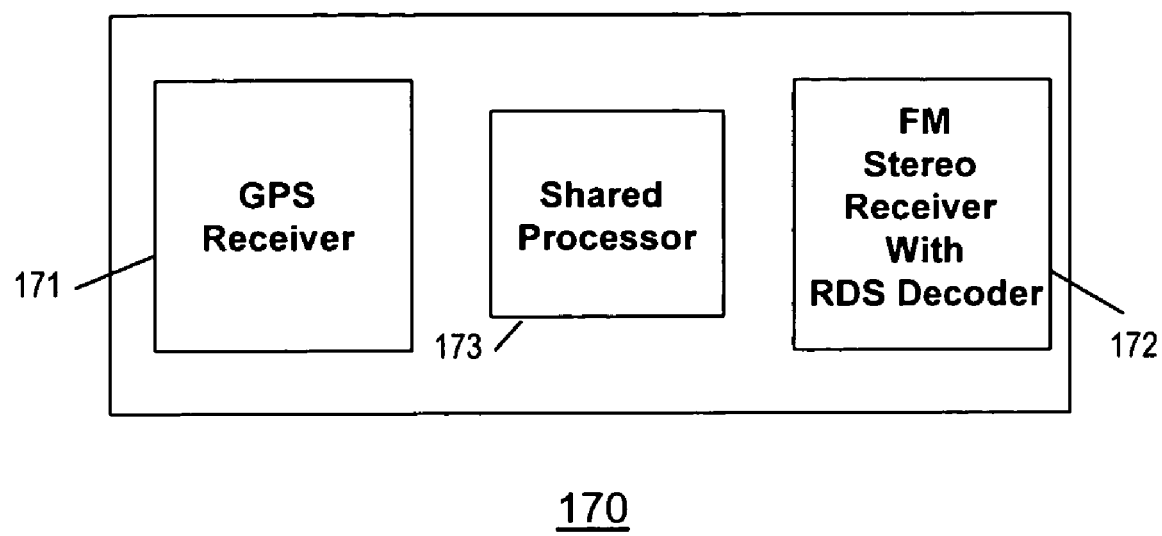
FIG. 14B shows a hybrid GPS-FM stereo receiver for positioning, according to an embodiment of the invention.

FIG. 14A shows an example process 140 for general dead reckoning application for GPS receiver with dead reckoning device. Process block 141 involves Kalman Filter Training for A and H Matrix with GPS positions. Process block 142 involves GPS positioning. The decision process block 143 is tested in each step of position fix. If the GPS satellites in view are 4 or more, the GPS receiver is functioning as usual; if the GPS satellites in view are 3 or less, then in process block 144 dead reckoning position fix is performed. At each position fix step, the number of GPS in view is checked to determine whether GPS or dead reckoning position fix is used. The Kalman filter matrix A and H can be trained by the GPS receiver posterior with known position for a finite period whenever GPS satellites in view is in the boundary condition (i.e., 4 satellites in view).

GPS-FM Hybrid Indoor/Outdoor Positioning

It is noted that when an FM stereo receiver is used in combination with GPS for dead reckoning, it is essentially a hybrid GPS-FM receiver to be used effectively at both outdoor and indoor locations/positions. The GPS receiver has the advantage of open field position with high accuracy. The FM pilot tone receiver will be effective indoor and in urban canyon with previous GPS position fixes used as a reference positions. All indoor locating table look-up or two equation solution approaches described previously can be used for the FM pilot tone receivers.

According to an embodiment of the invention, using FM pilot tones as a GPS dead reckoning means, it is required that the GPS and FM receiver operate cooperatively to derive indoor solutions. The GPS receiver can be combined with FM stereo receiver, providing an outdoor and indoor positioning unit, and integrated into a single chip. In addition, with the initial GPS position fix information, it is possible to determine geographically which three FM radio stations to be used to yield the best FM pilot tones TDOA triangulation.

Figure 14C:
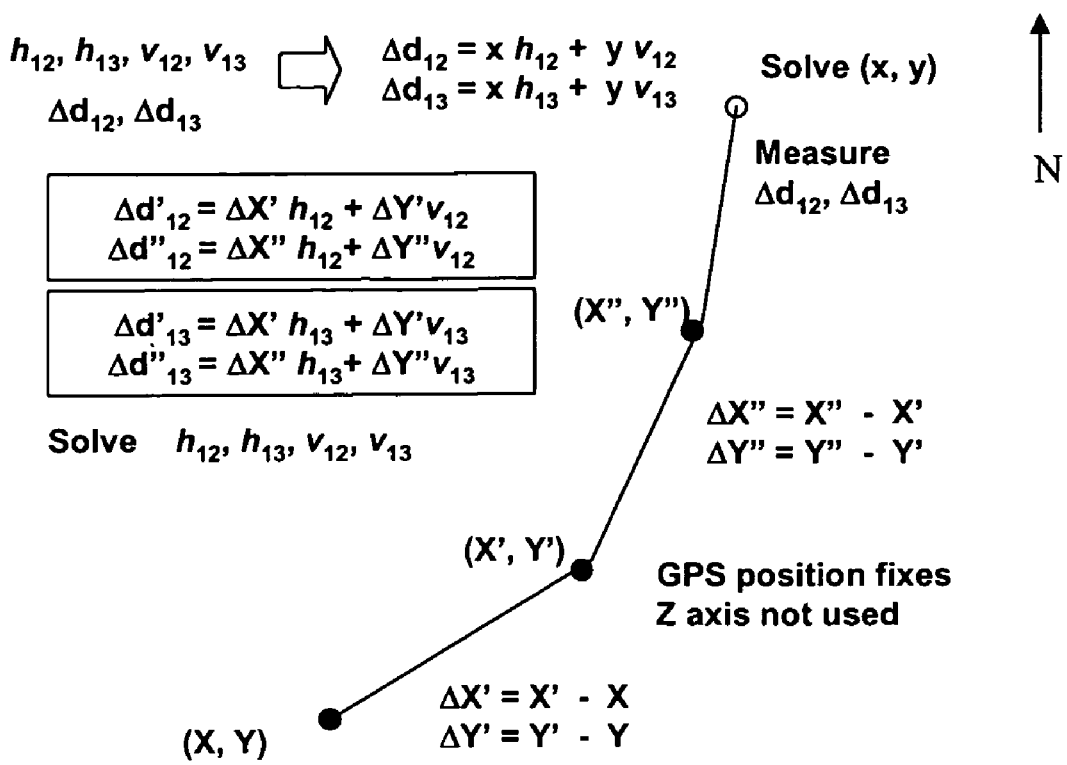
FIG. 14C shows a positioning process using a hybrid GPS-FM stereo receiver, according to an embodiment of the invention.

A schematic diagram of hybrid GPS-FM stereo receiver 170 is depicted in FIG. 14B where GPS and FM stereo receivers 171, 172, can share the same processor 173 to derive a combined GPS-FM solution. A simple example of an FM receiver assisting the GPS position fix and extend to indoor and urban canyon solution without knowledge of 3 radio station positions is described by example calculation 180 in FIG. 14C, wherein three consecutive GPS position fixes (X,Y), (X',Y') and (X",Y") are illustrated (Z axis is not used). The FM stations double phase differences $\Delta d'_{12}$, $\Delta d'_{13}$ and $\Delta d''_{12}$, $\Delta d''_{13}$ in consecutive steps, can be measured and differenced at each position fix via an FM receiver. Instead of Kalman filtering, a two-equation approach, as described previously in the simplified site preparation, can be used. Two equations with two measurements of double phase differences and two position fixes displacements to solve two unknowns $h_{12}$, $v_{12}$ are provided as:

$$\Delta d'_{12}=\Delta X'h_{12}+\Delta Y'v_{12}$$

$$\Delta d''_{12}=\Delta X''h_{12}+\Delta Y''v_{12}$$

where $\Delta X'=X'-X$, $\Delta Y'=Y'-Y$, $\Delta X''=X''-X'$, $\Delta Y''=Y''-Y'$.

The double differences $\Delta d'_{12}$, $\Delta d''_{12}$ and position displacement $\Delta X'$, $\Delta X''$, $\Delta Y'$, $\Delta Y''$ are measured and GPS position fix values, respectively. Therefore, the two unknowns $h_{12}$, $v_{12}$ (triple grid differences) can be solved uniquely. Similarly, $$\Delta d'_{13}=\Delta X'h_{13}+\Delta Y'v_{13}$$

$$\Delta d''_{13}=\Delta X''h_{13}+\Delta Y''v_{13}$$

The two unknowns $h_{13}$, $v_{13}$ can also be solved. After $h_{12}$, $h_{13}$, $v_{12}$, $v_{13}$ are solved with three or more GPS position fixes in the initial phase, together with each new double difference phase measurement $\Delta d_{12}$, $\Delta d_{13}$ obtained in subsequent steps, the following two equations solve new positions as:

$$\Delta d_{12}=xh_{12}+yv_{12}$$

$$\Delta d_{13}=xh_{13}+yv_{13}$$

The new unknown position (x, y) relative to the last GPS position fix can then be determined with phase measurement double differencing pairs ($\Delta d_{12}$, $\Delta d_{13}$). In this example, the FM position fix can help verify the accuracy of GPS position fix. And when the GPS signals are absent, it provides sole position solution for indoor and urban canyon. It is also noted that more than three position fixes are needed to determine $h_{12}$, $h_{13}$, $v_{12}$, $v_{13}$ in the order of most recent position fix. The precision can only be improved with more position fixes in a neighborhood area using the principle of large number averaging. In summary, the advantages of hybrid GPS-FM positioning are the following:

1. It will extend GPS receiver to become an all purpose, simplified outdoor, indoor and urban canyon positioning system.
2. It serves the purpose of smoothing the GPS position fix and improving position accuracy. Since commercial GPS positioning is normally done at one hertz, the positions in between second can be filled by FM receiver solution with many more position fixes since FM position fix can be performed more frequently. With the stability of FM pilot tones from three strong local radio station signals, the "differential" position determination is more stable and accurate than the weak GPS satellites ranging signals twenty thousand kilometers away and orbiting with high velocity and dynamics. Therefore, the FM position fix can be used for the purpose of smoothing the GPS position track, and correcting the GPS position anomaly, if any.

3. It provides position fixes when GPS signals fail or are jammed. In other words, it will improve the integrity of GPS positioning. The commercial GPS signals are very weak compared to very strong local FM signals and can be easily jammed. The GPS signal can be unreliable at times. The FM pilot tone signals can complement the GPS signals when the above conditions occurred.

4. The FM receiver 172 (FIG. 14B) can receive digital RDS broadcasting of differential GPS correction, as well as radio station phase biases at different reference (RS) sites. The RDS broadcasting of differential correction will serve as the means of high accuracy position fix for high precision hybrid GPS-FM receiver applications such as survey, construction, and others.

Three Dimensional Positioning Expansion

In another embodiment, the invention provides three dimensional positioning. FM stations are basically ground based towers which may provide limited VDOP (Vertical Dilution of Position). The invention can be expanded from relations (4), (5) to three relations to solve the position variables (x, y, z). Four or more FM stations may be used to obtain double differences $\Delta d_{12}$, $\Delta d_{13}$, $\Delta d_{14}$ and additional elevation increments e12, e13, e14 to solve three simultaneous equations as follows:

$$\Delta d_{12} = xh_{12} + yv_{12} + ze_{12}$$

$$\Delta d_{13} = xh_{13} + yv_{13} + ze_{13}$$

$$\Delta d_{14} = xh_{14} + yv_{14} + ze_{14}$$

The elevation increments $e_{12}$, $e_{13}$, $e_{14}$ may rely on a GPS receiver to have elevation differences in position fixes, which occurs slowly in ground navigation. Further the elevation positioning may not be as accurate as ground horizontal positioning due to poor VDOP from ground based FM radio stations. However, the Z-dimensional position fix will be ideal for GPS aviation aid. In indoor positioning for a multiple story building, the reference station (RS) in each story is relied upon to distinguish the vertical position by the RS receiver RSSI. If a reference station is not available in every story, a miniature barometer is constantly used to determine the height of a two dimensional position device. The FM stations described herein may comprise broadcast stations, local FM transmitters, low power FM transmitters, etc.

Example Implementations

There are many possible approaches for the implementation of the present invention. Two important elements affecting the position accuracy are the phase difference measurement precision of the pilot tone and the proximity of the base stations (or references stations) to the mobile station. The FM pilot tone is a universal 19 KHz base band sinusoidal signal to be extracted from the FM stereo multiplex signal. Each cycle of pilot tone will be 15,789.5 meter in linear distance traveled. To accurately measure the phase of the pilot tone waveform, a high frequency timer is used to clock the waveform zero crossing time. For example, a 100 MHz clock can measure the time in 10 nano-seconds or 3 meters interval. With more than 30 dB signal strength advantage and the modulating 19 KHz pilot tone, it will be least affected by multi-path. The multi-path problems for pilot tone are two fold: (1) macro multi-path of 19 KHz pilot tone traveling in various terrains, (2) micro multi-path of modulated VHF carrier at the receiver front end with building blockage and reflection. Both these multi-paths can be greatly reduced by the proposed embodiment of the invention.

A serial implementation module is used for not only obtaining higher position accuracy, but also to save implementation cost, size, power and weight. As shown by example system 150 in FIG. 15, a processor module 64 receives pilot tones and performs serial processing in an MU 60 (FIG. 6) and time sharing among three FM signals. The processor module 64 also allocates time to perform computation and transmission.

Since there are 19,000 cycles of pilot tone every second, each FM station will be allocated roughly 5,000 cycles to perform the phase detection in one second. The remaining time and between timer interrupts are used for computing and transmission. In an example of position fix at 5 times per second, 200 msec is the time shared in the MU among three stations for phase detection. There are 3800 cycles time of pilot tone to be used for phase detection in 200 msec. If each station used 1000 cycles of pilot tone for repeated phase detection, only 52.6 msec will be elapsed for each station. There are 42 msec left for station tuning and other computation. During phase detection, there is also time gap between rising edge interrupts for the other processing. In other words, there is abundant time for the module 64 to perform other functions such as averaging, smoothing and communication.

Since positioning determination is very sensitive to non-uniform delay among each processing channel, the serial implementation has the clear advantage of same amount of delay for each station. By differencing, these delays are cancelled out. In 200 msec period, the thermo and other noise delay is almost constant in this short period and being subtracted out.

Figure 15:
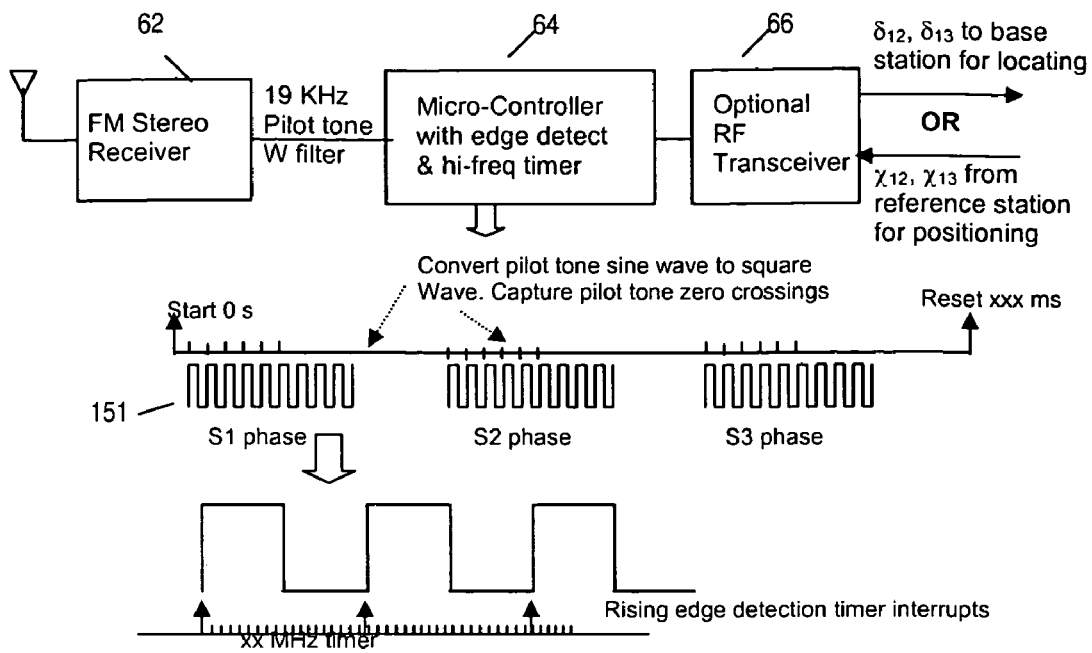
FIG. 15 shows a functional block diagram of a mobile station using one channel repeated phase detection for positioning, according to an embodiment of the invention.

In FIG. 15, the square wave 151 shown for each station (S1, S2, S3) is the result of sine to square wave conversion using a simple operation amplifier. An operation amplifier and rising edge interrupt timer are built-in with microcontrollers in the processor module 64. Each rising edge of the square wave is the phase of the pilot tone. When the rising edge is detected by the processor module 64, the high speed timer content is read by the processor module 64. There are 1000 readings of the timer interrupt for each FM station signal at the 5 Hz sampling. The time of arrival (TOA) can be averaged over 1000 samples to derive averaged pilot tone phase. The repeated phase detection improves the accuracy of TOA. The averaging of 1000 samples is called law of large numbers of smoothing in statistical theory. Let τ be the TOA of pilot tone rising edge. By average 1000 samples of arrival time becomes:

$$\tau_{ave} = \Sigma \tau_i / 1000, \text{ where } i=1, 2 \ldots 1000.$$

Using smoothing, the scale of TOA can be narrowed down to one thousandth of the scale. For example, if the processor module 64 timer used to count the TOA is 64 MHz, or 4.5 meter interval, by 1000 samples smoothing, the effective time measurement can be increased to 64 GHz, or 0.45 cm interval. The position accuracy variance σ is improved by σ/Sqrt (n). At 5 Hz measurement of 1000 phase readings per station, the error is reduced by Sqrt(1000)=31.62. After averaging the TOA, the timer count between S1 and S2, or S1 and S3 (i.e., TDOA) can be derived. Converting to distance scale, it provides $\delta_{m12}$, and $\delta_{m13}$. Similarly, this is performed in the base station to obtain $\delta_{m12}$, and $\delta_{m13}$.

In the process of smoothing, the effect of VHF waveform multi-path is averaged-out. Also, by using a serial channel, the effect of micro multi-path among three stations is cancelled out by differencing. As far as the macro 19 KHz phase variation going through various terrains is concerned, it is resolved by multiple reference stations spread out in citywide locations. The similarity of environment of MU and nearby RS will yield better differential accuracy.

Figure 16:
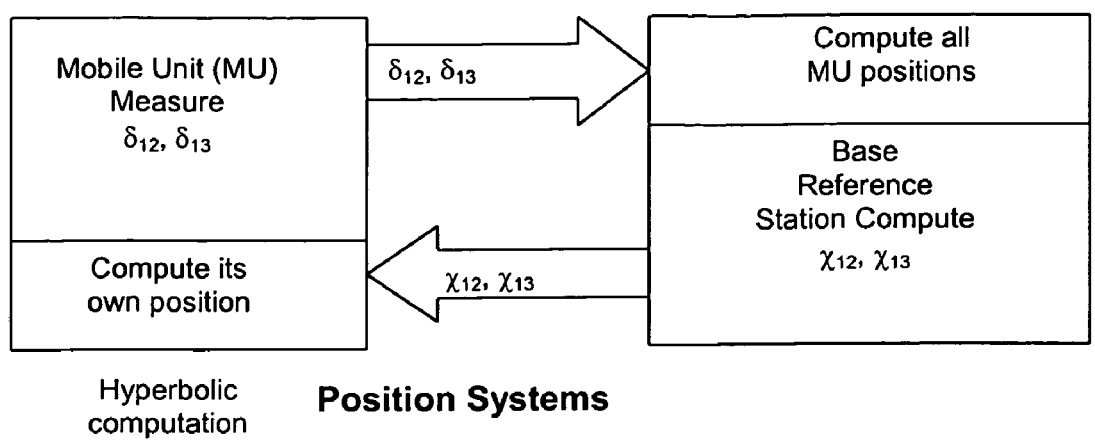
FIG. 16 shows a process for locating/positioning, according to an embodiment of the invention.

An example application of the present invention comprises locating and positioning as depicted by architecture 160 in FIG. 16. The operations of locating and positioning, and the direction of transmitting the phase difference information ($\delta_{12}$, $\delta_{13}$) or the original station biases ($\chi_{12}$, $\chi_{13}$), are illustrated.

The locating system MU may use simpler hardware without computing the MU position. The positioning system MU has to compute hyperbolic equations using received station biases from BS. A hybrid mode is also possible by sending the measurement from MU to BS for computation of position. The BS then returns the position solution to MU. This will make the MU processor simplified and low cost.

In E-911 application or Location Based Services (LBS), either locating or positioning technique can be used. The advantage is the existence of two way communications to transmit station bias $\chi_{12}$, $\chi_{13}$. If positioning technique is used, the MU (e.g., cell phone) will be similar to a GPS cell phone. The advantage over a GPS phone is that it can be used at indoor and urban canyon. The accuracy of positioning depends on the closeness and number of the citywide cell tower or RS.

For an auto theft locating application, a two way transceiver such as a two way pager is needed. At the reception of locating center station request, the mobile unit MU at hiding location of automobile will return with the strongest signal frequency or station number and then phase difference relative to the strongest signal of other stations are transmitted to center station; in the order of signal strength or station number. As many station strengths as possible are returned if the signal exceeding a threshold value. Based on the three of the top signal strengths matched to a known threesome stations of a known area, the differential distance $d_{12}$, $d_{13}$ as in relations (4), (5) above can be computed. The hyperbolic curve intersection computed from the threesome radio station will locate the theft car position. If multiple reference stations are used throughout the metropolitan area, the accuracy can be improved with localized reference. However, if only the central station is used as reference, the degree of accuracy may be sacrificed, but sufficient to locate the stolen car, nevertheless.

In a wide area citywide positioning system, since the FM signals from three stations will go through various terrains, natural and man made blockage, multi-path and scattering environment, which cause difference in phase variation at different locality. Nevertheless, if the RS is nearby the mobile unit (MU), same multi-path conditions will be presented at the MU and the RS. The relative differencing will cancel out the error when nearby RS is used. Therefore, multiple distributed RS in different locality are essential to obtain citywide positioning accuracy. To broadcast the multiple RS bias terms $\chi_{12}$, $\chi_{13}$, in various citywide locations, using wide area RDS digital modulation of FM side carrier at 57 KHz side carrier is most ideal (FIG. 1). The RDS signal carries data rate of 1187.5 bps. This data rate is sufficient to broadcast 100 FM stations phase biases about every 3 seconds. Either relative bias to the master FM station or relative bias from the GPS time (bias from ticks of GPS second) can be broadcasted from the RDS data channel (this may also serve as a means to synchronized time with GPS for general public without a GPS receiver). Such bias information is measured at multiple reference sites in the city with accurate GPS survey. 100 FM stations is only a hypothetical assumption. Practically, each metropolitan area has no more than 50 FM stations, and not every FM station is carrying a stereo signal at all times, and only a few FM stations will be selected with the best GDOP (geographical dilution of precision) for hyperbolic positioning. If all the FM stations synchronize their pilot tone with GPS time, then a BS or RS for positioning aid is not needed. In general, a high power metropolitan FM station (mostly located in a cluster at a hill site) is used for RDS broadcast, and local LPFM (low power FM) stations spread over different cities are used for hyperbolic triangulation.

Other example applications include:
1. Low cost Speedometer for walking, jogging, biking, or automobile—by making more than 10 Hz measurement and position fixes, the speed and vector of mobile unit is derived by position difference divided by 1/10 sec. The fastest runner runs 100 meter in 10 second. At 10 Hz per second, the sampling interval for the runner is 1 meter, which is quite sufficient.
2. Low cost Accelerometer—using the speed differentials of consecutive time intervals, the acceleration of mobile unit can be derived by further dividing the differential by 1/10 of second.
3. Low cost accurate Digital Compass or Yaw Angle Gyro—by using two linearly separated receiver units aligned with an automobile (front-to-back or side-to-side), the angle to the velocity vector obtained in the first application can determine the orientation of the automobile in digital form for many dead reckoning applications. However, for most applications when the velocity vector is aligned with the speed axis of the MU, the Digital Compass can be realized by one receiver.

Advantages of the Invention
4. Motion self detection: The MU discussed previously can periodically turn on and off (to save battery) the FM receiver to measure the phase differences among three radio stations $d_{12}$ and $d_{13}$ and memorized as current period phase differences. With the next period measurement of $d_{12}$ and $d_{13}$, we subtract previous measurement in memory to obtain $Dd_{12}$, $Dd_{13}$. If the double difference pair ($Dd_{12}$, $Dd_{13}$) is zero (or near zero due to insignificant measurement error), the MU does not detect motion between two consecutive periods. However, if the double difference pair is not zero and greater than predefined thresholds, the motion of MU is detected. Therefore the MU tag can be used as a motion detector for the object attached.
1. The invention leverages extracted FM pilot tone signals for navigation, rather than FM signal strength or AM signal phase of prior art.
2. The constant envelop FM broadcasting signal can penetrate buildings for indoor use as evidenced by the FM reception indoor. FM broadcast signal strength ranges from 25,000 Watts to 100,000 Watts for metropolitan FM stations, and ranges from 3000 Watts to 6000 Watts for LPFM (Low Power FM) community stations in different FCC classifications. The signal power is much stronger compared to the signal of an 100 mW for LAN-WiFi based indoor systems and 0.3 Watts to 1 Watt for cell phone signal. The accuracy of positioning is tied directly to the signal to noise ratio.
3. The invention leverages unique 19 KHz pilot tone in each FM band coherent with stereo broadcasting for positioning. This signal is not only protected in FM stereo spectrum with 8 KHz guard band, but is also a stable sinusoidal waveform at about 10 percent of total FM band power allocated. This signal is most ideal for use in TDOA positioning with multiple stereo FM stations.

4. Using local reference base station according to an embodiment of the invention, the positioning technique is the most appropriate for indoor and campus locating systems.
5. Compared to E-911 location techniques, E-911 invests heavily in base station facility to locate the subject cell phone. The invention provides very low cost, small size FM receiver additions to a cell phone unit, and does not require heavy base station investment.
6. The base band 19 KHz pilot tone has a much longer wave length of 15,789.5 meters and modulating the FM band frequencies from 88 to 108 MHz for each station. The cycle ambiguity and multi-path problem is easier to resolve according to the invention. In addition, FM signal strength of 30 dB more than other indoor RF signal greatly reduces the multi-path effect.
7. The present invention can be implemented using a low cost commercial one-chip FM transceiver, some with combined Blue Tooth device. The product package is small, low cost and more affordable than a GPS receiver.
8. The invention can augment the GPS receiver as a dead reckoning device with small hardware additions, or simply as a hybrid GPS FM receiver positioning device. The invention greatly enhances the GPS coverage to indoor and urban canyon with little cost increment.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of positioning, comprising:
one or more receivers receiving FM stereo signals from three FM stations, said stereo signal including a FM modulated 19 KHz pilot tone, wherein one of the receivers is a mobile unit (MU) comprising a FM stereo receiver, a processor and a transceiver;
said receivers performing phase bias corrections for the demodulated pilot tones in the FM signals to obtain phase corrected pilot tones;
the mobile unit receiving phase biases corrections from either base station or reference station, and measuring phase differences between the pilot tones;
the mobile unit performing two way communications to transmit phase measurement pairs to the base station or the reference station;
determining a geographical position at a receiver from the phase corrected pilot tones by performing Time Difference of Arrival (TDOA) hyperbolic triangulation and;
determining a geographical position at the mobile unit based on the measured phase differences with received phase biases corrections.

2. The method of claim 1 further including: one or more base station (BS) and/or reference station (RS), each computing pilot tone phase arrival differences based on synchronized pilot tones, and measuring the phase differences from unsynchronized received pilot tones, to determine multiple station to station unsynchronized pilot tone biases pairs, each base station (BS) and/or reference station (RS) comprising a FM stereo receiver, a transceiver and a processor.

3. The method of claim 2 further including: providing a local area map divided into finite grid points with surveyed geographical positions for each grid point, each grid point corresponding to computed phase differences of the pilot tones pairs at that grid point.

4. The method of claim 3 further including determining geographical position of a mobile unit by, for each grid point, determining a difference between the computed pilot tone phase differences at the grid point and computed phase differences at the base station or reference station, to form position double differencing pairs corresponding to a Cartesian (x, y) grid point coordinate relative to a base station or reference station at origin of the Cartesian plane, whichever is proximate to said grid point, and storing the coordinates in a look-up table corresponding to said double differencing pairs for determining the geographical position of the mobile unit.

5. The method of claim 4 further including receiving measured phase difference pairs from the mobile unit, and forming measured double difference pairs based on the measured phase difference pairs the mobile unit and the measured phase differences pairs at the base station or reference station, and comparing said double differencing pairs with the computed double differencing pairs in the look-up table to determine nearest grid point position coordinate (x, y) relative to the base station or reference station at origin.

6. The method of claim 5 further comprising: when radio station positions are not precisely known, performing pre-survey at finite grid points in horizontal and vertical coordinates surrounding the base station or reference station at origin of the Cartesian plane, obtaining double differencing pairs of measured pilot tone phase differences of finite grid points relative to the base station or reference station by subtracting the double difference pairs in consecutive grid points to obtain the triple grid differencing pairs for interpolation, and generating a position look-up table using non-uniform differences interpolation using the triple grid difference pairs.

7. The method of claim 6, with either known or unknown radio station positions, performing pre-survey at each finite grid point surrounding the base station or reference station to obtain triple grid difference pairs from said measured or computed double differencing pairs, averaging horizontal and vertical triple grid differencing pairs into triple grid difference parameters to form a 2 by 2 matrix, then with the measured double differencing pairs of mobile unit as two inputs, multiplying unknown Cartesian coordinate (x, y) of a mobile unit by said 2 by 2 matrix to form two simultaneous equations and solving to determine (x, y) coordinate of each mobile unit.

8. The method of claim 7 further including: transmitting said pre-surveyed triple differencing 2×2 matrix parameters from the base station or reference station to a mobile unit, wherein the mobile units performs position determination.

9. The method of claim 1 further including performing sequential and repetitive phase measurement of the pilot tone phases of three FM stations to determine relative phase differences in order to perform TDOA hyperbolic positioning.

10. The method of claim 1 further including performing dead reckoning for assisting a GPS receiver whenever GPS signals are insufficient, using latest GPS position fix as the reference position to continue step by step TDOA hyperbolic positioning using FM pilot tone signals.

11. The method of claim 10 wherein dead reckoning further includes: obtaining double differencing of TDOA pairs, and rate of change of double differencing TDOA pairs in consecutive steps measurements, to form a measurement vector input in a Kalman computation of position and velocity vector.

12. The method of claim 1 wherein an FM receiver is integrated with a GPS receiver for performing complementary positioning for outdoor and indoor positioning.

13. The method of claim 1 wherein determining geographical position further includes using multiple of 19 KHz pilot tones derivative at 57 KHz pilot tone or other FM sub-carriers pilot tone for determining geographical position.

14. The method of claim 1 further including receiving more than three FM station signals and determining geographical position therefrom.

15. The method of claim 1 further including utilizing said geographical position technique for E-911 service to locate cell phone units indoors or outdoors.

16. The method of claim 1 further including utilizing said geographical position technique for cell phone or other communication devices for location based services.

17. The method of claim 1 further including utilizing said geographical position technique for asset tracking and personal tracking.

18. The method of claim 1 wherein the FM stations include low power FM transmitters providing sinusoidal or periodic pilot tone modulation.

19. The method of claim 1 further including receiving FM signals from four or more FM station signals and determining three-dimensional geographical position based on the received signals.

20. The method of using FM stereo pilot tone signals of claim 1 wherein at least three broadcasted FM pilot tones are detected and changes in their respective phase differences between two time periods are used for motion detection by the mobile unit, and the object attached.

21. The mobile unit using the method of claim 20, wherein an FM stereo receiver receiving a least three FM demodulated pilot tones, and detecting changes in the phase differences among pilot tones between consecutive time periods are used to detect the motion of the mobile unit, and the object attached.

22. A system for positioning, comprising:
a base station including a communication module configured for receiving FM stereo signals from three or more FM stations, said stereo signal including a FM modulated 19 KHz pilot tone; and
a positioning module configured for determining a geographical position at the receiver based on the phase difference of the demodulated pilot tones in the received FM signals, performing phase bias corrections for demodulated pilot tones in the FM stereo signals to obtain phase corrected pilot tones, computing pilot tone phase arrival differences based on synchronized pilot tones, and measuring the phase differences from unsynchronized received pilot tones, to determine multiple station to station unsynchronized pilot tone biases pairs, and for determining a geographical position at a receiver from the phase corrected pilot tones by performing Time Difference of Arrival (TDOA) hyperbolic triangulation; and
a local area map divided into finite grid points with surveyed geographical positions for each grid point, each grid point corresponding to computed phase differences of the pilot tones pairs at that grid point.

23. The system of claim 22 wherein the positioning module is further configured to determine geographical position of a mobile unit by, for each grid point, determining a difference between the computed pilot tone phase differences at the grid point and computed phase differences at the base station, to form position double differencing pairs corresponding to a Cartesian (x, y) grid point coordinate relative to a base station at origin of the Cartesian plane, and storing the coordinates in a look-up table corresponding to said double differencing pairs for determining the geographical position of the mobile unit.

24. The system of claim 23 wherein the positioning module is configured for obtaining measured phase difference pairs from the mobile unit, and forming measured double difference pairs based on the measured phase difference pairs at the mobile unit and the measured phase differences pairs at the base station, and comparing said double differencing pairs with the computed double differencing pairs in the look-up table to determine nearest grid point position coordinate (x, y) relative to the base station at origin.

25. The system of claim 24 wherein when radio station positions are not precisely known, the positioning module utilizing a pre-survey map at finite grid points in horizontal and vertical coordinates surrounding the base station at origin of the Cartesian plane, and obtaining double differencing pairs of measured pilot tone phase differences of finite grid points relative to the base station by subtracting the double difference pairs in consecutive grid points to obtain the triple grid differencing pairs for interpolation, and generating a position look-up table using non-uniform differences interpolation using the triple grid difference pairs.

26. The system of claim 25, with either known or unknown radio station positions, the positioning module using a pre-survey at each finite grid point surrounding the base station to obtain triple grid difference pairs from said measured or computed double differencing pairs, averaging horizontal and vertical triple grid differencing pairs into triple grid difference parameters to form a 2 by 2 matrix, then with the measured double differencing pairs of mobile units as two inputs, multiplying unknown Cartesian coordinate (x, y) of a mobile unit by said 2 by 2 matrix to form two simultaneous equations and solving to determine (x, y) coordinate of each mobile unit relative to base station at origin.

27. The system of claim 26 wherein the communication module is further configured for transmitting said pre-surveyed triple differencing 2×2 matrix parameters from the base station to a mobile unit, wherein the mobile unit performs position determination.

28. The system of claim 22 wherein the positioning module is further configured for performing sequential and repetitive phase measurement of the pilot tone phases of three FM stations to determine relative phase differences in order to perform TDOA hyperbolic positioning.

29. The base station of claim 22 wherein the base station functions as a reference station.

30. The system of claim 22, wherein a reference station comprises a fixed cell phone tower linking to a cellular base station and the system further includes a cellular mobile unit, wherein position determination can be performed either at the cellular base station or at the cellular mobile unit.

31. The system of claim 22, wherein the base station comprises one or more low power FM transmitters, and implementing sinusoidal or periodical pilot tone FM modulation.

32. A mobile unit for positioning, comprising:
a communication module configured for receiving FM stereo signals from three or more FM stations, said stereo signal including a FM modulated 19 KHz pilot tone, the communication module further configured for receiving phase bias corrections from a base station or reference station, the communication module comprising a transceiver configured for performing two way communications to transmit phase measurement pairs to the base station or reference station for determining geographical position of the mobile unit; and a positioning module configured for measuring phase differences between the pilot tones, and determining a geographical position based on the measured phase differences with the received phase bias corrections.

33. The mobile unit of claim 32 wherein the positioning module is further configured for performing sequential and repetitive phase measurement of the pilot tone phases of three FM stations to determine relative phase differences in order to perform TDOA hyperbolic positioning.

34. The mobile unit of claim 32 wherein the positioning module is further configured for performing dead reckoning for assisting a GPS receiver whenever GPS signals are insufficient, using latest GPS position fix as the reference position to continue step by step TDOA hyperbolic positioning using FM pilot tone signals.

35. The mobile unit of claim 34 wherein the positioning module is further configured for dead reckoning by obtaining double differencing of TDOA pairs, and rate of change of double differencing TDOA pairs in consecutive steps measurements, to form a measurement vector input in a Kalman computation of position and velocity vector.

36. The mobile unit of claim 34 wherein the communication module comprises an FM receiver integrated with a GPS receiver for performing complementary positioning for outdoor and indoor positioning.

* * * * *